US011172131B1

(12) United States Patent
Le et al.

(10) Patent No.: US 11,172,131 B1
(45) Date of Patent: Nov. 9, 2021

(54) OPTICAL DEVICES FOR TILT IN CAMERA SYSTEMS

(71) Applicant: Western Digital Technologies, Inc., San Jose, CA (US)

(72) Inventors: Quang Le, San Jose, CA (US); Rajeev Nagabhirava, Santa Clara, CA (US); Kuok San Ho, Emerald Hills, CA (US); Zhigang Bai, Fremont, CA (US); Zhanjie Li, Pleasanton, CA (US); Xiaoyong Liu, San Jose, CA (US); Daniele Mauri, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/915,739

(22) Filed: Jun. 29, 2020

(51) Int. Cl.
| | |
|---|---|
| *H04N 5/232* | (2006.01) |
| *H04N 5/225* | (2006.01) |
| *G03B 3/10* | (2021.01) |
| *G03B 13/36* | (2021.01) |

(52) U.S. Cl.
CPC .......... *H04N 5/23287* (2013.01); *G03B 3/10* (2013.01); *G03B 13/36* (2013.01); *H04N 5/2254* (2013.01); *H04N 5/2257* (2013.01)

(58) Field of Classification Search
None
See application file for complete search history.

(56) References Cited

U.S. PATENT DOCUMENTS

| | | | |
|---|---|---|---|
| 7,679,647 B2 | 3/2010 | Stavely et al. | |
| 8,041,201 B2 | 10/2011 | Eromaki et al. | |
| 8,264,549 B2 | 9/2012 | Tokiwa et al. | |
| 8,780,217 B2 | 7/2014 | Irisawa et al. | |

(Continued)

FOREIGN PATENT DOCUMENTS

| | | |
|---|---|---|
| WO | 2016207754 A1 | 12/2016 |
| WO | 2019084728 A1 | 5/2019 |

OTHER PUBLICATIONS

Chang, Yu-Hao et al., "Design of Miniaturized Optical Image Stabilization and Autofocusing Camera Module for Cellphones", Sensors and Materials, vol. 29, No. 7, Jul. 26, 2017, pp. 989-995.

(Continued)

*Primary Examiner* — William B Perkey
(74) *Attorney, Agent, or Firm* — Patterson & Sheridan, LLP; Steven H. Versteeg

(57) ABSTRACT

Aspects of the present disclosure generally relate to optical devices and related methods that facilitate tilt in camera systems, such as tilt of a lens. In one example, an optical device includes a lens, an image sensor disposed below the lens, a plurality of magnets disposed about the lens, and a plurality of: (1) vertical coil structures coiled in one or more vertical planes and (2) horizontal coil structures coiled in one or more horizontal planes. When power is applied, the coil structures can generate magnetic fields that, in the presence of the magnets, cause relative movement of the coil structures and associated structures. The plurality of vertical coil structures are configured to horizontally move the lens. The plurality of horizontal coil structures are configured to tilt the lens when differing electrical power is applied to at least two of the plurality of horizontal coil structures.

17 Claims, 12 Drawing Sheets

(56) References Cited

U.S. PATENT DOCUMENTS

| | | | |
|---|---|---|---|
| 9,134,503 B2* | 9/2015 | Topliss | G02B 7/08 |
| 9,329,356 B2 | 5/2016 | Chao et al. | |
| 9,360,735 B2* | 6/2016 | Lim | G02B 7/36 |
| 9,516,212 B2 | 12/2016 | Kang et al. | |
| 9,599,836 B2 | 3/2017 | Lam | |
| 9,746,689 B2* | 8/2017 | Ollila | G02B 27/646 |
| 9,955,086 B2 | 4/2018 | Park | |
| 9,983,380 B2 | 5/2018 | Kang et al. | |
| 10,269,895 B2 | 4/2019 | Babcock et al. | |
| 10,303,041 B2 | 5/2019 | Sharma | |
| 10,429,608 B1 | 10/2019 | Baer et al. | |
| 10,516,826 B2 | 12/2019 | Miller et al. | |
| 10,520,697 B2 | 12/2019 | Hu et al. | |
| 10,890,734 B1 | 1/2021 | Sharma et al. | |
| 2004/0190402 A1 | 9/2004 | Matsui | |
| 2005/0265705 A1 | 12/2005 | Uenaka | |
| 2009/0251551 A1 | 10/2009 | Uenaka | |
| 2012/0099201 A1 | 4/2012 | Chan et al. | |
| 2013/0321917 A1* | 12/2013 | Nakayama | G02B 27/646 359/557 |
| 2015/0207983 A1 | 7/2015 | Kang et al. | |
| 2015/0256727 A1* | 9/2015 | Kim | H04N 5/2257 348/208.12 |
| 2016/0085086 A1 | 3/2016 | Rho et al. | |
| 2016/0119517 A1 | 4/2016 | Topliss | |
| 2016/0231529 A1 | 8/2016 | Mitsuyasu | |
| 2017/0176710 A1* | 6/2017 | Peng | G02B 7/09 |
| 2017/0177301 A1* | 6/2017 | Hollis | G06F 13/385 |
| 2018/0091709 A1 | 3/2018 | Yeo | |
| 2018/0157004 A1 | 6/2018 | Huang et al. | |
| 2018/0246341 A1* | 8/2018 | Jung | H02K 41/0354 |
| 2018/0329170 A1 | 11/2018 | Huang et al. | |
| 2018/0356473 A1 | 12/2018 | Hirota et al. | |
| 2019/0020822 A1 | 1/2019 | Sharma et al. | |
| 2019/0058832 A1* | 2/2019 | Huang | H04N 5/23248 |
| 2019/0116317 A1* | 4/2019 | Hu | H04N 5/23296 |
| 2019/0141248 A1 | 5/2019 | Hubert et al. | |
| 2019/0196156 A1 | 6/2019 | Goldenberg et al. | |
| 2019/0204531 A1 | 7/2019 | Sugawara | |
| 2019/0235202 A1 | 8/2019 | Smyth et al. | |
| 2019/0373174 A1 | 12/2019 | Ba-Tis et al. | |
| 2020/0026095 A1 | 1/2020 | Miller et al. | |
| 2020/0064587 A1* | 2/2020 | Yu | H02K 41/0356 |
| 2020/0124839 A1 | 4/2020 | Aschwadnden et al. | |
| 2020/0209439 A1 | 7/2020 | Hu et al. | |
| 2020/0260011 A1 | 8/2020 | Sasaki et al. | |
| 2020/0314338 A1 | 10/2020 | Johnson et al. | |
| 2020/0314345 A1 | 10/2020 | Moriya et al. | |

OTHER PUBLICATIONS

Simon; Eric et al., "Liquid lens enabling real-time focus and tilt compensation for optical image stabilization in camera modules", Proceedings of SPIE—The International Society for Optical Engineering, Apr. 2010, pp. 1-7.

"Folded Camera Actuation & OIS Telephoto Camera OIS and Auto Focus," <https://corephotonics.com/inventions/folded-camera-actuation-and-ois>.

International Search Report and the Written Opinion for International Application No. PCT/US2020/066657 dated Mar. 24, 2021, 15 pages.

International Search Report and the Written Opinion for International Application No. PCT/US2020/066660 dated Mar. 22, 2021, 16 pages.

Non-Final Office Action dated May 27, 2021 of U.S. Appl. No. 16/915,742.

Simon et al. "Optical design rules of a camera module with a liquid lens and principle of command for AF and OIS functions," Proceedings of SPIE—The International Society for Optical Engineering, Nov. 2010, 14 pages.

* cited by examiner

OPTICAL DEVICES FOR TILT IN CAMERA SYSTEMS

BACKGROUND OF THE DISCLOSURE

Field of the Disclosure

Aspects of the present disclosure generally relate to optical devices and related methods that facilitate tilt in camera systems, such as tilt of a lens.

Description of the Related Art

Cameras are used to take images and/or videos of targets, such as persons or objects, in a variety of contexts and environments. Images and videos taken by the cameras, however, can become unstable or out of focus, such as when the camera is moved or shaken, or when manufacturing results in camera components that are out of alignment. Cameras can sometimes not sufficiently account for the instability or become out of focus, causing image defects and hindering image quality of the camera.

Components of cameras also may not be able to tilt.

Therefore, there is a need in the art for optical devices and related methods that facilitate tilt and that facilitate optimal image stabilization (01S) and autofocus (AF) of camera systems.

SUMMARY OF THE DISCLOSURE

Aspects of the present disclosure generally relate to optical devices and related methods that facilitate tilt in camera systems, such as tilt of a lens. In one example, an optical device includes a lens, an image sensor disposed below the lens, a plurality of magnets disposed about the lens, and a plurality of: (1) vertical coil structures coiled in one or more vertical planes and (2) horizontal coil structures coiled in one or more horizontal planes. When power is applied, the coil structures can generate magnetic fields that, in the presence of the magnets, cause relative movement of the coil structures and associated structures. The generated magnetic fields attract or repel the magnets, facilitating relative movement of the coil structures. The plurality of vertical coil structures are configured to horizontally move the lens. The plurality of horizontal coil structures are configured to tilt the lens when differing electrical power is applied to at least two of the plurality of horizontal coil structures. An optical axis of the lens is titled relative to a vertical axis. The plurality of horizontal coil structures can also translationally move the lens vertically. The coil structures can also be used to move/tilt the image sensor. In addition, various embodiments are directed to arrangements of such coil structures and magnets, and magnet compositions and designs, to improve efficiency of the overall system.

In one implementation, an optical device includes a lens, an image sensor disposed below the lens, a plurality of magnets disposed about the lens, and a plurality of vertical coil structures coiled in one or more vertical planes. The optical device includes a plurality of horizontal coil structures coiled in one or more horizontal planes. The plurality of horizontal coil structures tilt the lens when differing electrical power is applied to at least two of the plurality of horizontal coil structures. Each of the horizontal planes is oriented perpendicularly to the one or more vertical planes.

In one implementation, an optical device includes a lens, an image sensor disposed below the lens, and a plurality of magnets disposed about the lens. The optical device also includes a plurality of vertical coil structures coiled in one or more vertical planes, and a plurality of horizontal coil structures coiled in one or more horizontal planes. The plurality of horizontal coil structures tilt the lens when differing electrical power is applied to at least two of the plurality of horizontal coil structures. Each of the horizontal planes is oriented perpendicularly to the one or more vertical planes. Each horizontal coil structure of the plurality of horizontal coil structures is disposed at least partially above an upper surface of a respective magnet of the plurality of magnets.

In one implementation, an optical device includes a lens, an image sensor disposed below the lens, a first plurality of magnets disposed about the lens and at corners of a square pattern, and a second plurality of magnets disposed about the lens and at sides of the square pattern. The optical device includes a plurality of vertical coil structures coiled in one or more vertical planes. Each vertical coil structure of the plurality of vertical coil structures is disposed inwardly of an inner surface of a respective magnet of the second plurality of magnets. The optical device also includes a plurality of horizontal coil structures coiled in one or more horizontal planes. Each of the horizontal planes is oriented perpendicularly to the one or more vertical planes, and each horizontal coil structure of the plurality of horizontal coil structures is disposed at least partially above or below a respective magnet of the first plurality of magnets.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
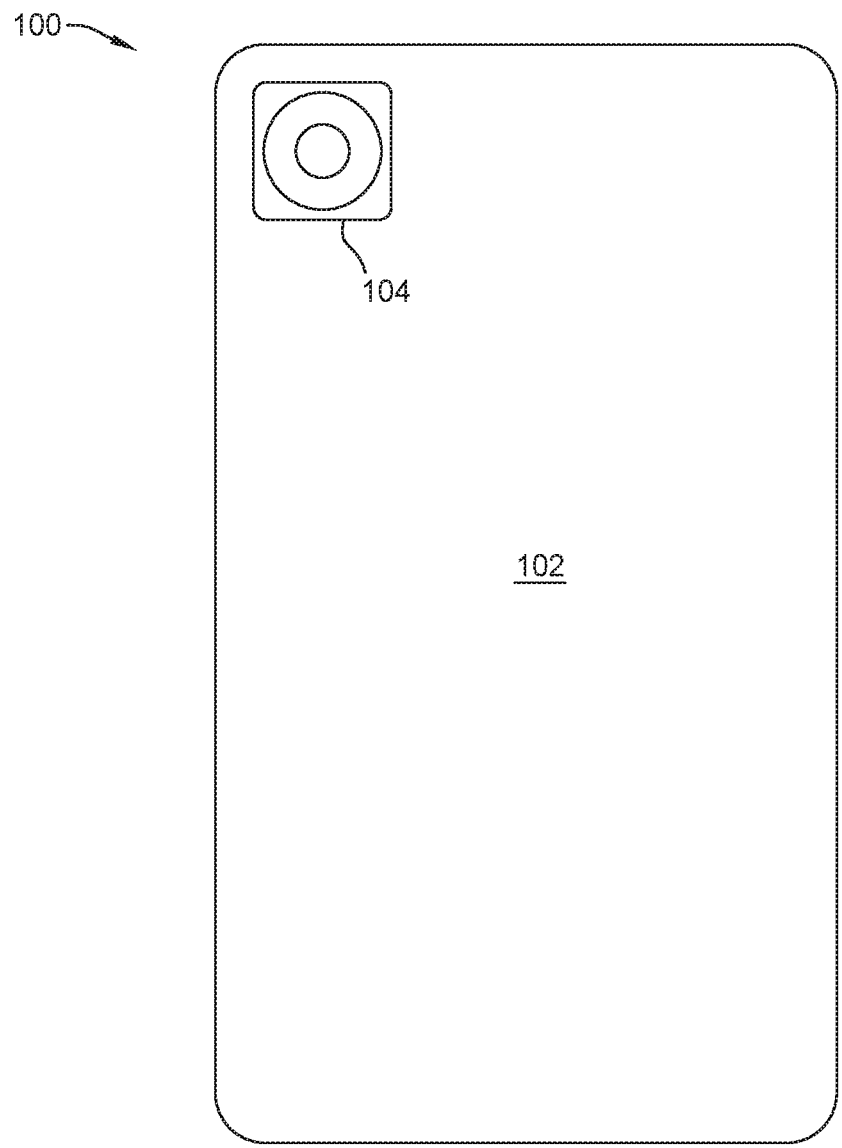
FIG. 1 is a schematic illustration of a device housing a camera, according to disclosed embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to optical devices and related methods that facilitate tilt in camera systems, such as tilt of a lens. In one example, an optical device includes a lens, an image sensor disposed below the lens, a plurality of magnets disposed about the lens, and a plurality of: (1) vertical coil structures coiled in one or more vertical planes and (2) horizontal coil structures coiled in one or more horizontal planes. When power is applied, the coil structures can generate magnetic fields that, in the presence of the magnets, cause relative movement of the coil structures and associated structures. The generated magnetic fields attract or repel the magnets, facilitating relative movement of the coil structures. The plurality of vertical coil structures are configured to horizontally move the lens. The plurality of horizontal coil structures are configured to tilt the lens when differing electrical power is applied to at least two of the plurality of horizontal coil structures. An optical axis of the lens is titled relative to a vertical axis. The plurality of horizontal coil structures can also translationally move the lens vertically. The coil structures can also be used to move/tilt the image sensor. In addition, various embodiments are directed to arrangements of such coil structures and magnets, and magnet compositions and designs, to improve efficiency of the overall system.

The plurality of horizontal coil structures moving the lens vertically and tilting the lens facilitate autofocus (AF) functions for the camera system, facilitate adjusting for misalignment (e.g., non-parallelism) between the lens and the image sensor, and facilitate obtaining a wider angle of view for the lens. The plurality of vertical coil structures horizontally moving the lens facilitate optical image stabilization (OIS) functions for the camera system.

It is to be understood that relational terms used herein such as "horizontal," "vertical," "above," "below," "lower", and "upper" are understood to be in relation to the pertinent camera system. As an example, the camera system may be positioned such that horizontal planes are parallel to gravitational forces and vertical planes are perpendicular to gravitational forces.

The optical devices and camera systems described herein are described as part of a smartphone device. It is to be understood that aspects described herein may be used as part of other personal devices, such as other mobile devices (for example tablets) or personal computers (for example laptops or desktops), or other systems, such as surveillance camera systems, aviation camera systems, or vehicular camera systems. The present disclosure contemplates that the aspects describe herein may be used in any camera system.

FIG. 1 is a schematic illustration of a device 100 housing a camera 104, according to disclosed embodiments. The device 100 includes a housing 102 and a camera 104. The device 100 may include any of a wide range of devices, including desktop computers, notebook (e.g., laptop) computers, tablet computers, set-top boxes, telephone handsets such as so-called "smart" phones, so-called "smart" pads, televisions, security cameras, display devices, digital media players, video gaming consoles, video streaming device, and the like.

The housing 102 may be formed using any materials by joining a first end of a first wall to a first end of a second wall, a second end of a second wall to a first end of a third wall, a second end of a third wall to a first end of a fourth wall, and a second end of a fourth wall to a second end of the first wall. Furthermore, the housing 102 may be formed by including a fifth wall and a sixth wall. The sixth wall is joined to a first edge of the first wall, a first edge of the second wall, a first edge of the third wall, and a first edge of the fourth wall. The fifth wall is joined to a second edge of the first wall, a second edge of the second wall, a second edge of the third wall, and a second edge of the fourth wall. The first edge and second edge are on opposite sides of each wall. The plurality of walls, the sixth wall, and the fifth wall may be joined together by any suitable structures such as adhesives, fasteners (for example, screws), joints, or any combination thereof. It is contemplated that other methods not listed of joining together materials may be applicable.

The housing 102 may house components such as a controller, a non-volatile memory, a power supply, a volatile memory, an interface, a buffer, a printed circuit board, and the like. Furthermore, the housing 102 may have a slot for additional memory storage devices, such as single-level cell memory, multi-level cell memory, triple-level cell memory, quad-level cell memory, and the like. The housing 102 may also have a connection unit to a power source or to transfer data to and from the device 100. Each component of the device 100 may be mechanically attached to the housing 102 or to another component and may include electrically conductive traces that electrically interconnect components of the device 100. In one example, the device 100 may be connected directly to a computer server, network attached storage unit, or the like.

The camera 104 may include any function relating to an optical instrument used to record images and/or video. The camera 104 captures light photons, where the light photons may be in the visible spectrum and/or in other portions of the electromagnetic spectrum (e.g., the infrared spectrum). The camera 104 includes a small opening (e.g., an aperture) to let the light in to capture an image on a light-sensitive surface or substrate (e.g., a photographic film or a digital sensor). The opening may be any shape suitable to let light into the camera 104 such as a circular opening. The substrate may include a transition metal-halide. In one example, the camera 104 is configured to adjust the size of the small hole to allow more or less light into the camera 104. The camera 104 may also have a shutter mechanism to determine the amount of time the light-sensitive surface is exposed to the light. In other embodiments, the images captured by the camera may be stored on a memory storage device as a series of images over time, (e.g., a video).

Figure 2A:
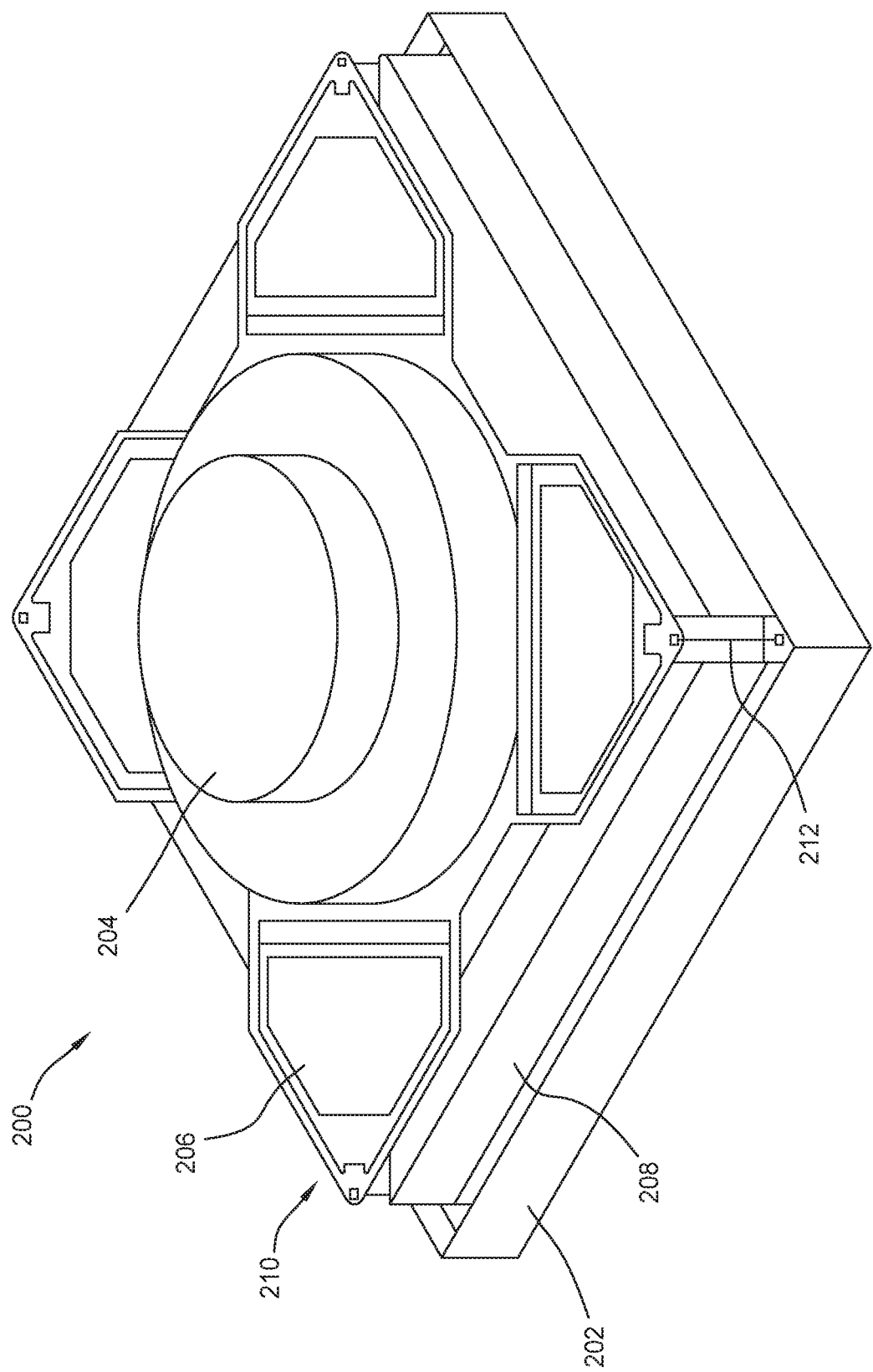
FIG. 2A is a schematic illustration of a top isometric view of a camera system, according to disclosed embodiments.

FIG. 2A is a schematic illustration of a top isometric view of a camera system 200, according to disclosed embodiments. The camera system 200 may be used as the camera 104 described in FIG. 1. The camera system 200 includes a frame 202, a lens 204, a magnet housing 208 for a plurality of magnets 206 (four are shown), where each magnet 206 may be coupled to one or more coils, such as an optical image stabilization (OIS) coil and/or an autofocus (AF) coil. Each magnet 206 may be coupled to a top panel 210 and a plurality of wires 212.

Figure 2B:
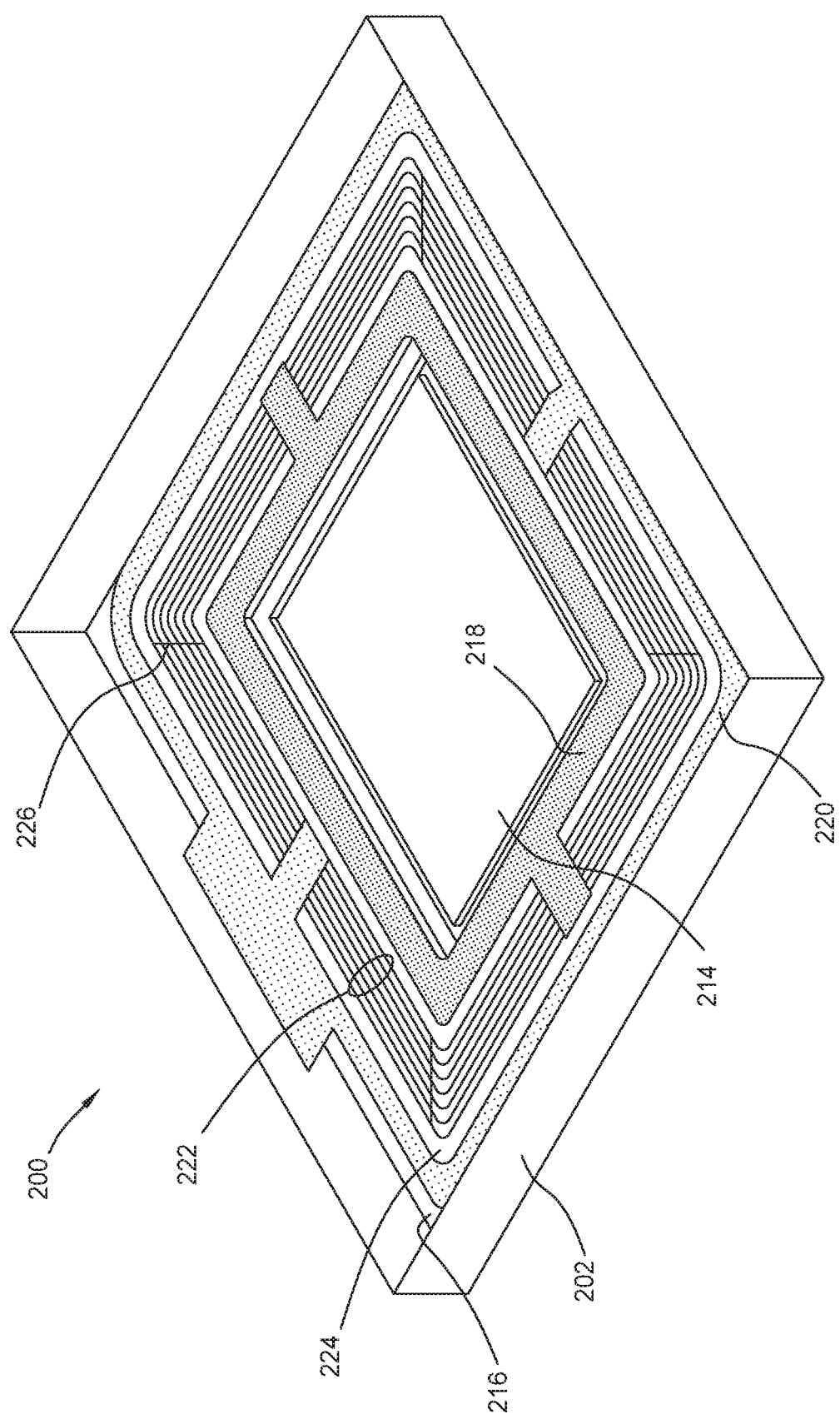
FIG. 2B is a schematic illustration of a bottom isometric view of the camera system shown in FIG. 2A, according to disclosed embodiments.

FIG. 2B is a schematic illustration of a bottom isometric view of the camera system 200 shown in FIG. 2A, according to disclosed embodiments. The camera system 200 further includes an image sensor 214, a bottom panel 216, an adjustable platform 218, a static platform 220, a plurality of panel arms 222, a base 224, and a plurality of panel stabilizers 226.

The frame 202 of the camera system 200 may be formed by the materials described in the housing 102 of FIG. 1. The frame 202 may be part of, integrally formed with, and/or coupled to the housing of FIG. 1. The lens 204 may include one more optical lens elements, where light passing through the lens 204 is captured at the image sensor 214. The light passing through the lens 204 converges to a point on the image sensor 214. The image sensor 214 may be situated on the static platform 220 of the bottom panel 216 of the base 224. The base 224 may include other components such as circuitry for the function of the various components of the camera system 200.

The adjustable platform 218 includes a plurality of panel arms 222 and a plurality of panel stabilizers 226. The plurality of panel arms 222 may shift or adjust the plurality of magnets 206 as a response to a change in the current passing through the OIS coils and/or the AF coils. The plurality of panel stabilizers 226 may include any suitable material for vibration dampening. The plurality of wires 212 may connect the top panel 210 to the bottom panel 216. The top panel 210 and the bottom panel may be constructed from any appropriate material that may allow for some amount of flex during the operation of the camera system 200.

Figure 3:
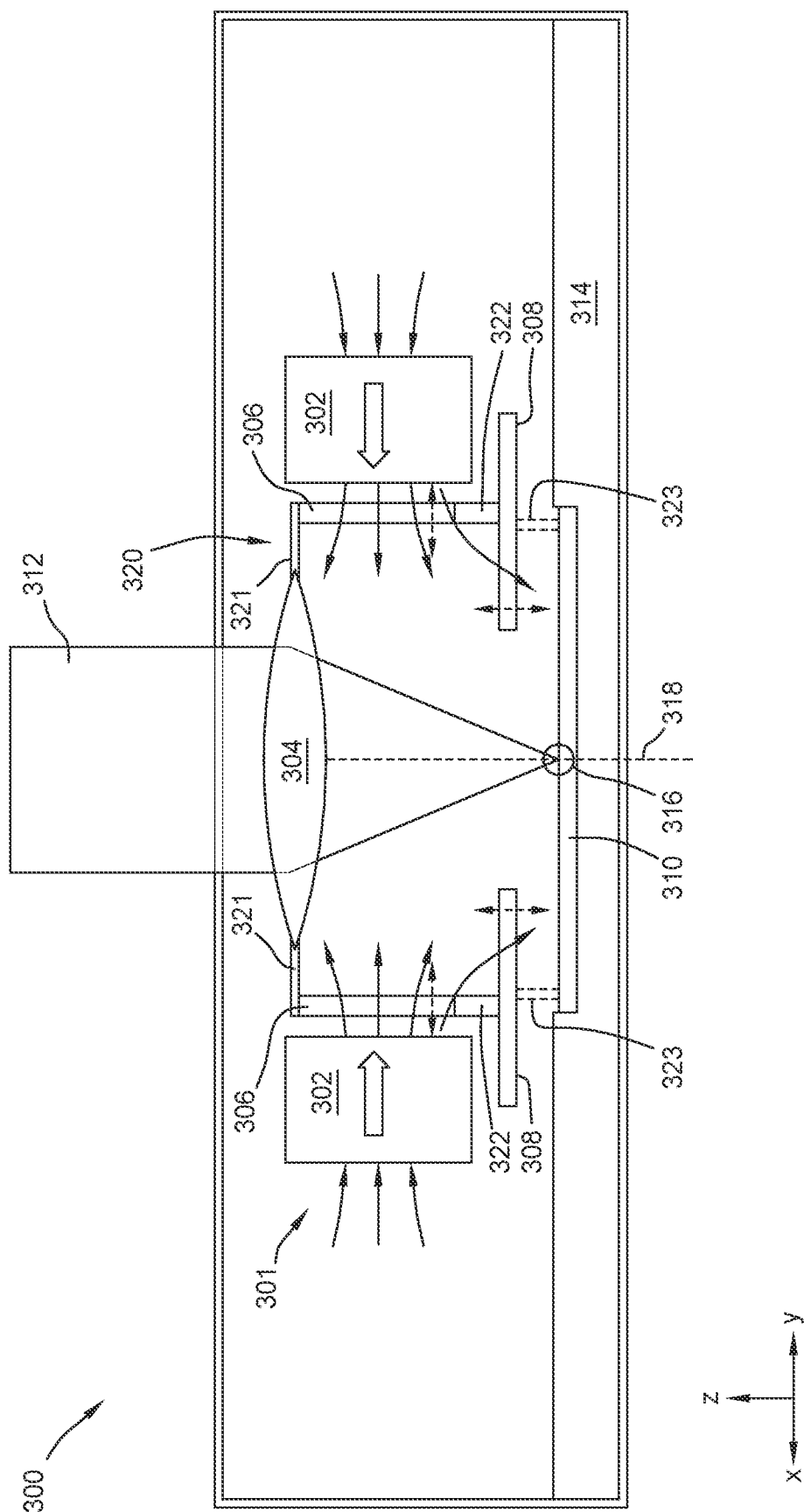
FIG. 3 is a schematic illustration of a side view of a camera system including an optical device, according to disclosed embodiments.

FIG. 3 is a schematic illustration of a side view of a camera system 300 including an optical device 301, according to disclosed embodiments. The camera system 300 may be similar to the device 100 shown in FIG. 1 and/or the camera system 200 shown in FIG. 2, and may include one or more of the aspects, components, features, and/or properties thereof. The camera system 300 includes a lens 304, a plurality of magnets 302 disposed about the lens 304, a plurality of vertical coil structures 306, a plurality of horizontal coil structures 308, an image sensor 310, and a base 314. The camera system 300 may be used as the camera system 200 shown in FIG. 2, and the base 314 may be used as the base 224 of FIG. 2. In the descriptions herein, vertical coil structures (such as the vertical coil structures 306) may be referred to as OIS coils and horizontal coil structures (such as the horizontal coil structures 308) may be referred to as AF coils, for exemplary purposes. The plurality of OIS coils 306 are oriented along and coiled in one or more vertical planes (e.g., vertical planes parallel to the y-z plane) and the plurality of AF coils 308 are oriented along and coiled in one or more horizontal planes (e.g., horizontal planes parallel to the x-y plane). The vertical planes and the horizontal planes are oriented perpendicularly to each other. The image sensor 310 is disposed below the lens 304 and the one or more magnets 302 are disposed about the lens.

In FIG. 3, two magnets 302 are illustrated; however, more than two magnets, such as any amount of magnets between about two magnets to about eight magnets (such as four magnets), may be applicable to the embodiments disclosed. Furthermore, two OIS coils 306 and two AF coils 308 are illustrated; however, more than two OIS coils, such any amount of OIS coils between about two OIS coils to about eight OIS coils (such as four OIS coils), and more than two AF coils, such as any amount of AF coils between about two AF coils to about eight AF coils (such as four AF coils), may be applicable to the embodiments disclosed.

As light 312 passes through the lens 304 that may include one or more lenses, the light 312 is refracted and converged to a central point 316 (e.g., a principal focus) on the image sensor 310. The vertical axis at the central point 316 may be referred to as the optical axis 318 of the image sensor 310. Images recorded when the central point 316 of the converged light 312 intersects the image sensor 310 may generally be of better quality than the images recorded when the central point 316 of the converged light 312 does not intersect the image sensor 310.

In order to adjust where the central point 316 of the light 312 is located, the one or more OIS coils 306 and the one or more AF coils 308 are utilized. The lens 304 is attached to a magnetically suspended structure 320 (indicated by the dotted lines) that is movable in the x-y plane and/or the z-direction. The magnetically suspended structure 320 includes horizontal members 321 coupled between the lens 304 and the OIS coils 306 and vertical members 322 coupled between the OIS coils 306 and the AF coils 308. In one embodiment, which can combined with other embodiments, the image sensor 310 is coupled to the base 314, and is received in a recess formed in the base 314. In one embodiment, which can combined with other embodiments, the image sensor 310 is movable relative to the base 314.

The movement along the x-y plane and/or the z-direction of the magnetically suspended structure 320, and hence the lens 304 and/or the image sensor 310, may be used to minimize the shake or vibration of the camera system 300 during camera operation. The lens 304 may be moved along the x-y plane utilizing the one or more OIS coils 306, indicated by the horizontal dashed arrows intersecting the OIS coils 306. Furthermore, the lens 304 may be moved along the z-direction to change the position of the central point 316 of the light 312 by utilizing the one or more AF coils 308 (indicated by the vertical dashed arrows intersecting the AF coils 308).

During operation, electric power is applied to the OIS coils 306 and the AF coils 308 to energize the coils and generate magnetic fields. Each magnet 302 has a magnetic field traveling from the south pole to the north pole of the magnet 302 (indicated by the arrows extending through the magnets 302). Based on the magnetic fields generated by either the OIS coils 306, the AF coils 308 or both the OIS coils 306 and the AF coils 308, the OIS coils 306 and/or the AF coils 308 are either attracted or repelled by the magnets 302. Movement of the OIS coils 306 and/or the AF coils 308 using the magnets 302 facilitate movement of the magnetically suspended structure 320.

By adjusting the current (e.g., electrical power) traveling through either the OIS coils 306, the AF coils 308, or both the OIS coils 306 and the AF coils 308, the lens 304 may be moved to a position relative to the image sensor 310 to facilitate OIS and/or AF corrections. Each of the plurality of AF coils 308 may have capability to have differing electrical power, such that one AF coil 308 may move independently of another AF coil 308 to generate a lens 304 tilt, such as a tilt of the optical axis 318 of the lens 304 relative to a vertical axis (e.g., the z-axis). Misalignment (e.g., non-parallelism) between the lens 304 and the image sensor 310 plane due to camera manufacturing or motion from the camera device during operation may be compensated by utilizing a lens 304 tilt or shift. Furthermore, the lens may be tilted to achieve a wider angle of view for the camera system during device operation.

In one embodiment, which can be combined with other embodiments, the image sensor 310 may be coupled to the plurality of OIS coils 306 and/or the plurality of the AF coils 308 using a magnetically suspended structure. In one example, the optical device 301 includes second vertical members 323 coupled between the image sensor 310 and the AF coils 308 to move the image sensor 310 in a vertical direction (e.g., parallel to the z-axis) and/or in a horizontal direction (e.g., parallel to the x-y plane). By adjusting the current (e.g., electrical power) traveling through either OIS coils 306, the AF coils 308, or both the OIS coils 306 and the AF coils 308, the image sensor 310 may be moved to realize OIS and/or AF corrections. In the descriptions herein, where adjustments such as by moving or tilting the lens 304 are described, it is contemplated that such embodiment described may also be applicable to the image sensor 310. In one embodiment, which can be combined with other embodiments, the AF coils 308 may be used to control horizontal movement, vertical movement, and/or tilt of the lens 304 independently of the OIS coils 306 controlling horizontal movement, vertical movement, and/or tilt of the image sensor 310.

Figure 4A:
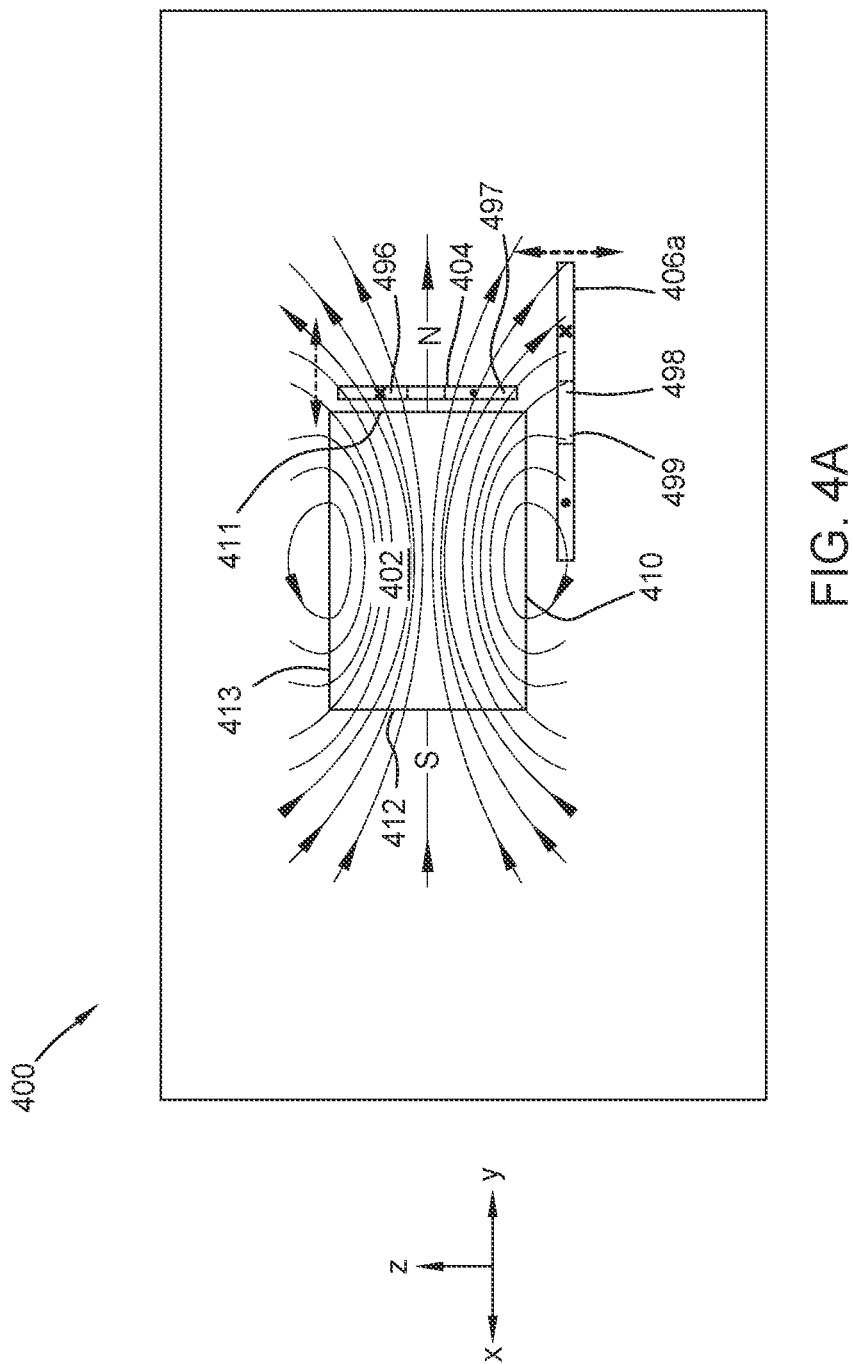
FIGS. 4A-4C are schematic illustrations of side views of multiple coil arrangements of an optical device of a camera system, according to disclosed embodiments.
Figure 4B:
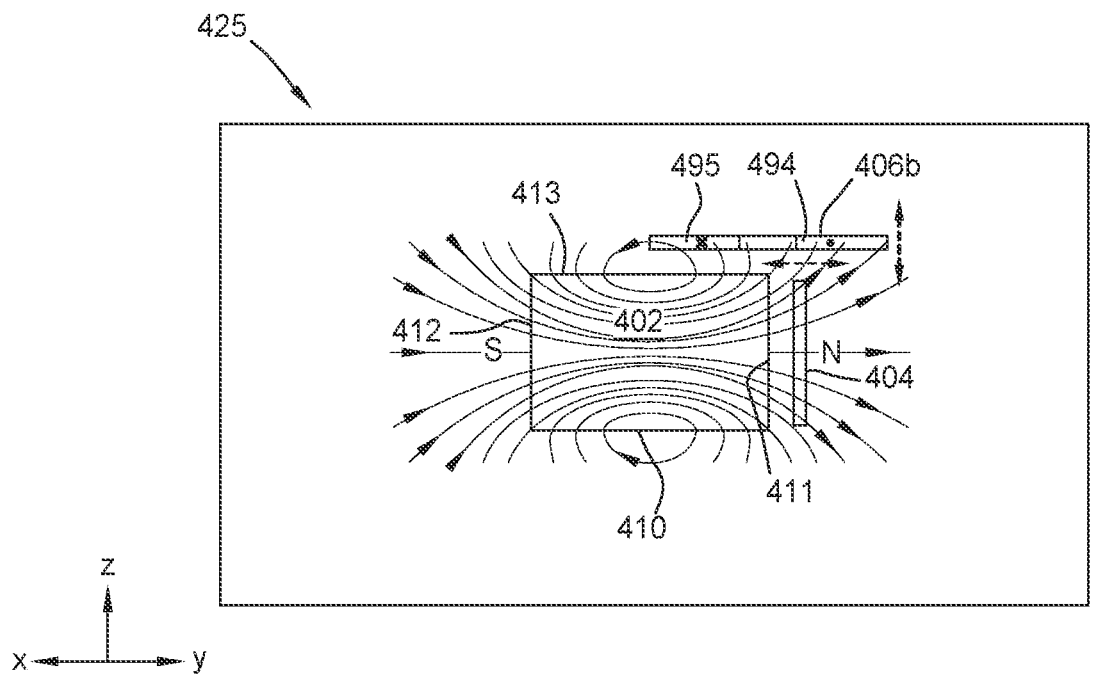
Figure 4C:
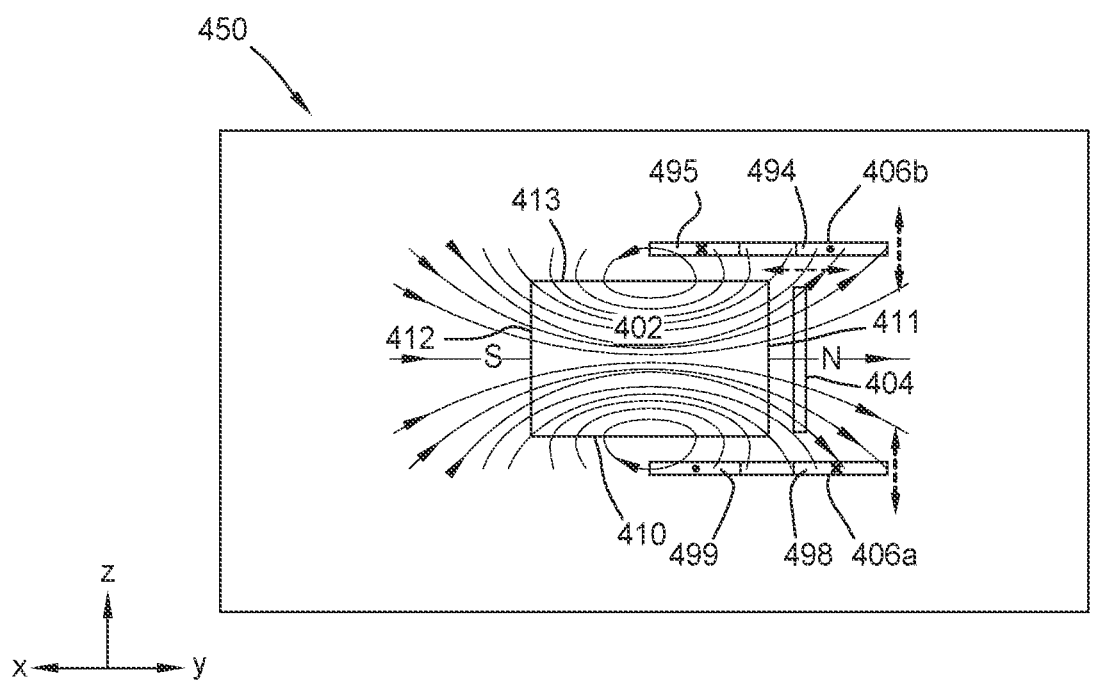

FIGS. 4A-4C are schematic illustrations of side views of multiple coil arrangements 400, 425, 450 of an optical device of a camera system, according to disclosed embodiments. The multiple coil arrangements 400, 425, 450 may be used in the device 100, the camera system 200, and/or the camera system 300 described herein. In the multiple coil arrangements 400, 425, 450, a magnetic field of a magnet 402 of a plurality of magnets is illustrated by the solid arrows traveling from a south pole S to a north pole N of the magnet 402. Though the multiple coil arrangements 400, 425, 450 illustrate a single magnet 402, the disclosed embodiments may reflect on some or all of the plurality of magnets of a camera system.

In FIG. 4A, the multiple coil arrangement 400 includes an OIS coil 404 and a first AF coil 406a. The OIS coil 404 is coiled in a vertical plane (in the Z-direction) and disposed adjacent to the magnet 402 and inwardly of an inner surface 411 of the magnet 402. The present disclosure contemplates that the OIS coils 404 may be disposed outwardly of outer surfaces (such as the outer surface 412 described below) of the respective magnets 402. The first AF coil 406a is coiled in a horizontal plane (in the X-Y plane) and disposed at least partially below a lower surface 410 of the magnet 402. The first AF coil 406a includes a first portion 499 aligned vertically under the magnet 402 and a second portion 498 aligned vertically inwardly of the inner surface 411 of the magnet 402. An outward end of the first portion 499 is aligned vertically under a center of the magnet 402. A center of the first AF coil 406a in the x-y plane is aligned vertically under the inner surface 411 of the respective magnet 402 or inwardly of the inner surface 411. Electrical current flows through the first AF coil 406a in a loop. Hence, the electrical current flows in a direction out of the page when flowing through the first portion 499 (denoted by a dot), and the electrical current flows in a direction into the page when flowing through the second portion 498 (denoted by an "x"). The dot and x convention for current flow directions will be used in this and other figures. The OIS coil 404 includes a first portion 497 through which electrical current flows in a direction out of the page, and a second portion 496 through which the electrical current flows in a direction into the page.

In one embodiment, which can be combined with other embodiments, one of the first portion 499 or the second portion 498 of the first AF coil 406a is aligned vertically outwardly of an outer surface 412 of the magnet 402, and the other of the first portion 499 or the second portion 498 is aligned vertically under the magnet 402. In such an embodiment, the center of the first AF coil 406a is aligned vertically under the outer surface 412 of the respective magnet 402 or is aligned outwardly of the outer surface 412. The positions of the first AF coil 406a facilitate magnetic field experienced by the first AF coil 406a being larger, facilitating efficiency and less electrical power (e.g., current) needed for the first AF coil 406a. The positions of the first AF coil 406a facilitate the first AF coil 406a experiencing less stray magnetic field and experiencing more direct magnetic field to move (e.g., vertically), the first AF coil 406a.

In the multiple coil arrangement 425 shown in FIG. 4B, the multiple coil arrangement 425 includes the OIS coil 404 and a second AF coil 406b. The first AF coil 406a may be omitted in the multiple coil arrangement 425 shown in FIG. 4B. The second AF coil 406b is disposed at least partially above an upper surface 413 of the magnet 402. The second AF coil 406b includes a first portion 495 aligned vertically above the magnet 402 and a second portion 494 aligned inwardly of the inner surface 411 of the magnet 402. An outward end of the first portion 495 is aligned vertically above a center of the magnet 402. A center of the second AF coil 406b is aligned vertically above the inner surface 411 of the respective magnet 402 or is aligned inwardly of the inner surface 411. Electrical current flows through the second AF coil 406b in a loop. Hence, the electrical current flows in a direction out of the page when flowing through the second portion 494, and the electrical current flows in a direction into the page when flowing through the first portion 495.

In one embodiment, which can be combined with other embodiments, one of the first portion 495 or the second portion 494 of the second AF coil 406b is aligned vertically outwardly of the outer surface 412 of the magnet 402 and the other of the first portion 495 or the second portion 494 is aligned vertically above the magnet 402. In such an embodiment, the center of the second AF coil 406b is aligned vertically above the outer surface 412 of the respective magnet 402 or is aligned outwardly of the outer surface 412.

In the multiple coil arrangement 450 shown in FIG. 4C, the multiple coil arrangement 450 includes the OIS coil 404, the first AF coil 406a shown in FIG. 4A, and the second AF coil 406b shown in FIG. 4B and disposed at least partially above the first AF coil 406A. The two AF coils 406a, 406b may operate in unison to move the lens in the z-direction more quickly or along a greater distance than by using only one AF coil, such as only a first AF coil 406a or only a second AF coil 406b.

In the multiple coil arrangements 400, 425, 450, the centers of the AF coils 406a, 406b are aligned with the inner surfaces 411 or the outer surfaces 412 of the respective magnets 402. In the multiple coil arrangements 400, 425, 450, outward ends of the first portions 499, 495 of the AF coils 406a, 406b are aligned vertically above or vertically below the center of the respective magnet 402, which results in a larger magnetic force experienced by the AF coils 406a, 406b (as shown by the higher density of magnetic field lines in the figures in those regions) using the electrical power and the magnets 402. The larger magnetic forces experienced by the AF coils 406a, 406b facilitate energy efficiency and less electrical power (e.g., current) needed for the AF coils 406a, 406b. The positions of the AF coils 406a, 406b facilitate the AF coils 406a, 406b experiencing less stray magnetic field and experiencing more direct magnetic field to move (e.g., vertically), the AF coils 406a, 406b.

The magnet 402 may have one or more AF coils 406a, 406b associated with the magnet 402, where each AF coil 406a, 406b of different magnets 402 may operate independently of each other. In one embodiment, which can be combined with other embodiments, the AF coils 406a, 406b are located directly beneath and/or above the magnet 402, such that little to no portion of the AF coils 406a, 406b is aligned inwardly or outwardly of the magnet 402. In one example, centers of the AF coils 406a, 406b are aligned with centers of the magnets 402.

FIGS. 5-10 are schematic illustrations of top views of positionings of pluralities of magnets and pluralities of coils, according to disclosed embodiments. The locations of pluralities of magnets 520a-d, 620a-d, 720a-d, 820a-d, 920a-h, 1020a-c; the locations of pluralities of AF coils 522a-d, 622a-d, 722a-d, 822a-d, 922e-h, 1022a-c; and the locations of pluralities of OIS coils 524a-d, 624a-d, 724a-d, 824a-d, 924a-d, 1024a-c are intended to show a general area that the component may be within an optical device of a camera system. Variations in the locations may be applicable in embodiments not specifically illustrated in FIGS. 5-10.

Each of AF coils 522a-d, 622a-d, 722a-d, 822a-d, 922e-h, 1022a-c of the FIGS. 5-10 may operate independently of each other, such that one or more AF coils of an embodiment may have a different electrical power than another one or more AF coils of the same embodiment. The non-uniform electrical power supplied to the one or more AF coils (e.g., a different electrical power supplied to at least one, but not all AF coils) may generate a lens tilt, such that the tilt changes the positioning of the center point (e.g., principal focus) of a lens away from a center of an image sensor. Misalignment (e.g., non-parallelism) between the lens and the image sensor plane due to camera manufacturing or motion from the camera device during operation may be compensated by utilizing a lens tilt. In one example, an optical axis of the lens tilts relative to a vertical axis. The lens also may be tilted to achieve a wider angle of view during device operation. The image sensor may also be tilted to remedy misalignment or achieve a wider angle of view during device operation due to the coupling of the image sensor to the magnetically suspended structure.

Aspects of FIG. 3 and FIGS. 4A-4C may be similar or may be applicable to the embodiments discussed in FIGS. 5-10. For example, the AF coils 522a-d, 622a-d, 722a-d, 822a-d, 922e-h, 1022a-c may either be partially disposed beneath respective adjacent magnets, be partially disposed above respective adjacent magnets, or both be partially disposed beneath the respective adjacent magnets and be partially disposed above the respective adjacent magnets. The magnets are disposed at corners or at sides of a shape, such as a rectangular shape or a triangular shape. Magnets located in a corner may have an octagonal shape (as shown for example in FIG. 5), such as a non-regular octagonal shape having a profile in the shape of an isosceles trapezoid. Magnets located along a side of a shape may have a rectangular shape (as shown for Example in FIG. 7). The previously listed shapes of the magnets are not intended to be limiting, but to provide an example of possible embodiments.

Figure 5:
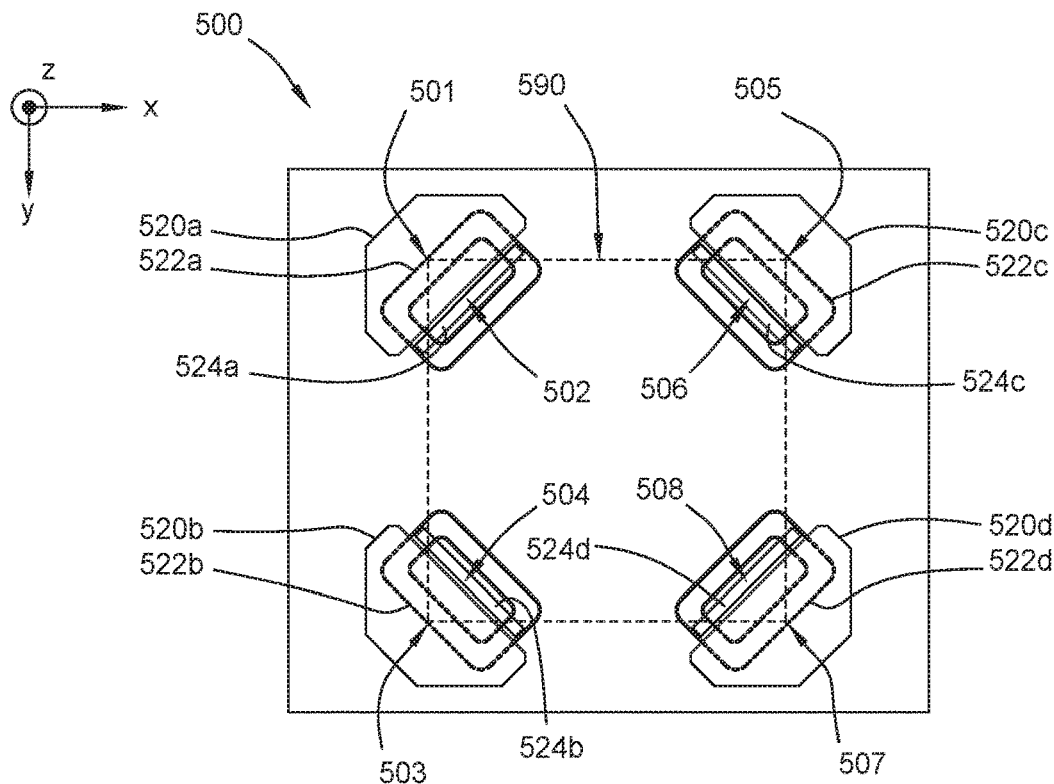
FIGS. 5-10 are schematic illustrations of top views of positionings of pluralities of magnets and pluralities of coils, according to disclosed embodiments.

FIG. 5 illustrates a schematic top view of a multiple coil arrangement 500 of an optical device, according to disclosed embodiments. The multiple coil arrangement 500 includes four magnets 520a-d, four AF coils 522a-d, and four OIS coils 524a-d disposed along a rectangular pattern 590, such as a square pattern. The four magnets 520a-d are located at four corners of the square pattern. The first magnet 520a is located in a first location 501, the second magnet 520b is located in a third location 503, the third magnet 520c is located in a fifth location 505, and the fourth magnet 520d is located in a seventh location 507. In one embodiment, which can be combined with other embodiments, centers of the four magnets 520a-d in the x-y plane are aligned with the four respective corners of the rectangular pattern 590.

A lens and/or an image sensor may be tilted when differing electrical power is applied to at least two of the AF coils of the plurality of AF coils 522a-d. When the same electrical power is applied to each of the plurality of AF coils 522a-d, the lens and/or the image sensor may be vertically moved parallel to the z-axis without tilting the lens and/or the image sensor. The electrical power (e.g., current) applied to each AF coil of the plurality of AF coils 522a-d and each OIS coil of the plurality of OIS coils 524a-d may be calibrated for various OIS positions, AF positions, and tilt angles.

In one embodiment, which can be combined with other embodiments, the AF coils 522a-d are disposed at gaps from each other, and the OIS coils 524a-d are disposed at gaps from each other.

The first AF coil 522a associated with the first magnet 520a is located between the first location 501 and a second location 502. The second AF coil 522b associated with the second magnet 502b is located between the third location 503 and the fourth location 504. The third AF coil 522c associated with the third magnet 502c is located between the fifth location 505 and the sixth location 506. The fourth AF coil 522d associated with the fourth magnet 520d is located between the seventh location 507 and the eighth location 508.

The first OIS coil 524a associated with the first magnet 520a is located in a second location 502. The second OIS coil 524b associated with the second magnet 520b is located in a fourth location 504. The third OIS coil 524c associated with the third magnet 520c is located in a sixth location 506. The fourth OIS coil 524d associated with the fourth magnet 520d is located in an eighth location 508.

In one embodiment, which can be combined with other embodiments, the magnets and coils located at, inwardly of, outwardly of, or between the respective locations 501-508 are disposed at, inwardly of, outwardly of, or between the respective locations 501-508 such that centers in the x-y plane of the magnets and coils are aligned with, inwardly of, outwardly of, or between the respective locations 501-508.

In one embodiment, which can be combined with other embodiments, centers of the AF coils 522a-d in the x-y plane are vertically offset from centers of the respective adjacent magnets 520a-d in the x-y plane.

A surface (such as a lower surface) of each of one or more magnets of the plurality of magnets 520a-d faces a respective AF coil of the plurality of AF coils 522a-d. The surface of the magnet 520a-d includes a first surface area, and the respective AF coil 522a-d includes a second surface area facing the surface of the respective magnet. The second surface area is a ratio R of the first surface area, and the ratio R is within a range of 0.8 to 1.2.

Figure 6:
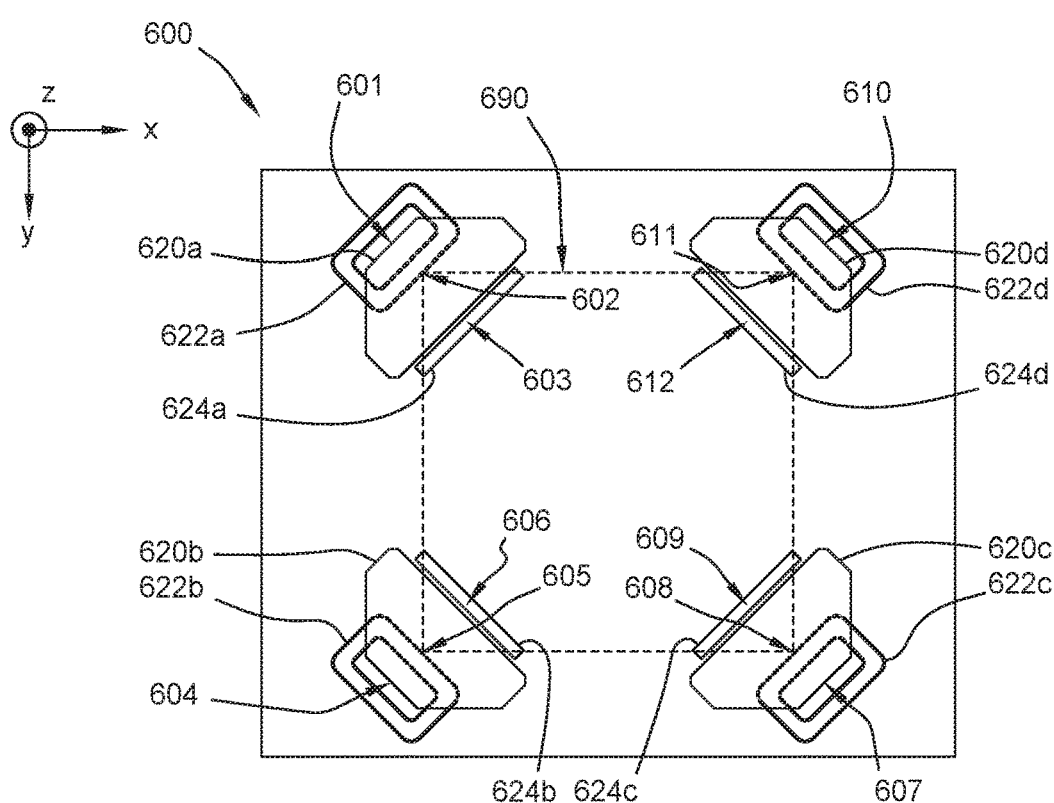

FIG. 6 illustrates a schematic top view of a multiple coil arrangement 600 of an optical device, according to disclosed embodiments. The multiple coil arrangement 600 includes four magnets 620a-d, four AF coils 622a-d, and four OIS coils 624a-d disposed along a square pattern 690. The four magnets 620a-d are located at the corners of the square pattern 690. The first magnet 620a is located in a second location 602, the second magnet 620b is located in a fifth location 605, the third magnet 620c is located in an eighth location 608, and the fourth magnet 620d is located in an eleventh location 611.

The first AF coil 622a associated with a first magnet 620a is located at a first location 601 or outwardly of the first location 601. The second AF coil 622b associated with a second magnet 620b is located at a fourth location 604 or outwardly of the fourth location 604. The third AF coil 622c associated with a third magnet 620c is located at a seventh location 607 or outwardly of the seventh location 607. The fourth AF coil 622d associated with a fourth magnet 620d is located at a tenth location 610 or outwardly of the tenth location 610.

The first OIS coil 624a associated with a first magnet 620a is located in a third location 603. The second OIS coil 624b associated with a second magnet 620b is located in a sixth location 606. The third OIS coil 624c associated with a third magnet 620c is located in a ninth location 609. The fourth OIS coil 624d associated with a fourth magnet 620d is located in a twelfth location 612.

Figure 7:
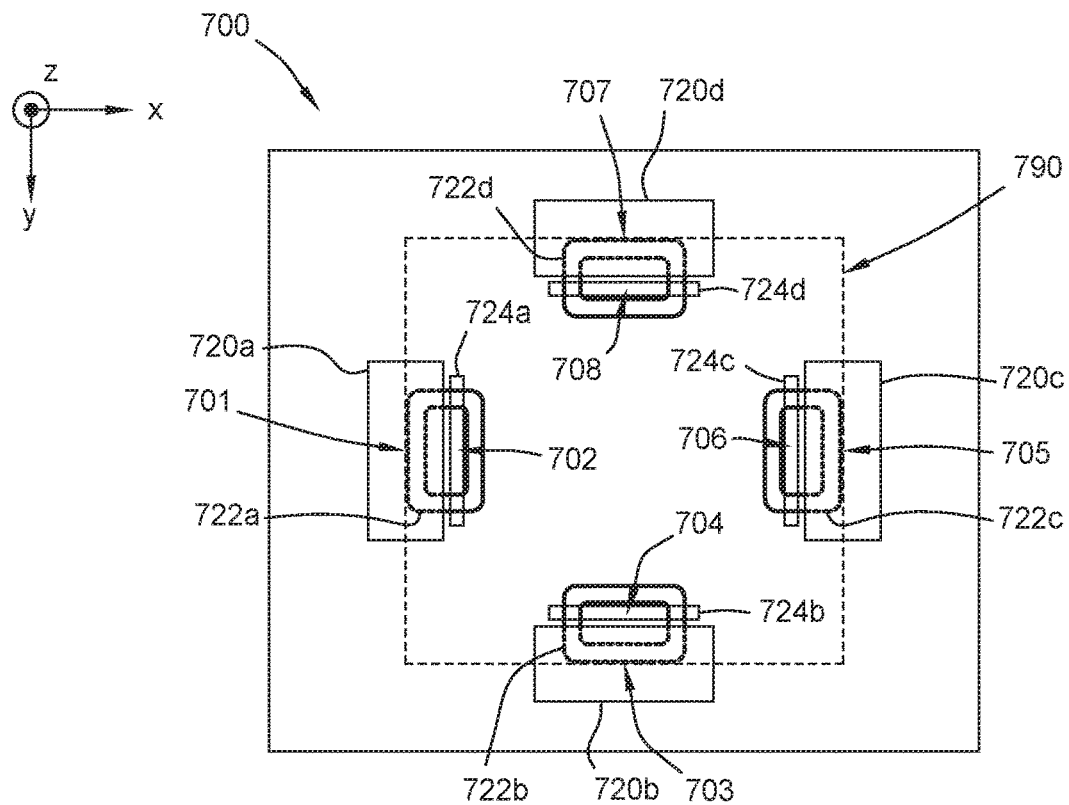

FIG. 7 illustrates a schematic top view of a multiple coil arrangement 700 of an optical device, according to disclosed embodiments. The multiple coil arrangement 700 includes four magnets 720a-d, four AF coils 722a-d, and four OIS coils 724a-d disposed along a square pattern 790. The magnets 720a-d, the AF coils 722a-d, and the OIS coils 724a-d are disposed at respective sides of the four sides of the square pattern 790. Each side of the square pattern 790 includes a magnet from the four magnets 720a-d. The first magnet 720a is located in a first location 701, the second magnet 720b is located in a third location 703, the third magnet 720c is located in a fifth location 705, and the fourth magnet 720d is located in a seventh location 707. In one embodiment, which can be combined with other embodiments, centers of the four magnets 720a-d in the x-y plane are aligned with the four respective sides of the square pattern 790.

The first AF coil 722a associated with the first magnet 720a is located between the first location 701 and a second location 702. The second AF coil 722b associated with the second magnet 720b is located between the third location 703 and a fourth location 704. The third AF coil 722c associated with the third magnet 720c is located between the fifth location 705 and a sixth location 706. The fourth AF coil 722d associated with the fourth magnet 720d is located between the seventh location 707 and an eighth location 708.

The first OIS coil 724a associated with the first magnet 720a is located in the second location 702. The second OIS coil 724b associated with the second magnet 720b is located in the fourth location 704. The third OIS coil 724c associated with the third magnet 720c is located in the sixth location 706. The fourth OIS coil 724d associated with the fourth magnet 720d is located in the eighth location 708.

Figure 8:
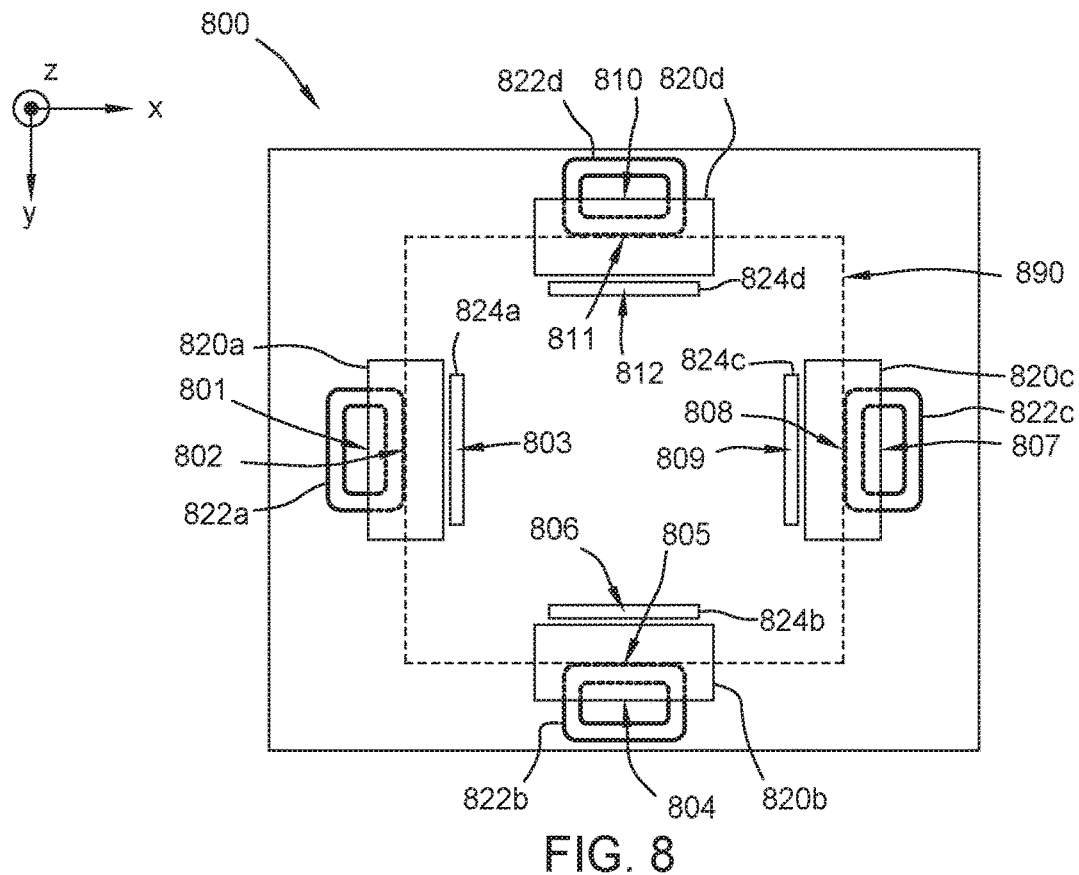

FIG. 8 illustrates a schematic top view of a multiple coil arrangement 800 of an optical device, according to disclosed embodiments. The multiple coil arrangement 800 includes four magnets 820a-d, four AF coils 822a-d, and four OIS coils 824a-d disposed along a square pattern 890. Each side of the square pattern 890 includes a magnet from the four magnets 820a-d. The first magnet 820a is located in a second location 802, the second magnet 820b is located in a fifth location 805, the third magnet 820c is located in an eighth location 808, and the fourth magnet 820d is located in an eleventh location 811.

The first AF coil 822a associated with a first magnet 820a is located at a first location 801 or outwardly of the first location 801. The second AF coil 822b associated with a second magnet 820b is located at a fourth location 804 or outwardly of the fourth location 804. The third AF coil 822c associated with a third magnet 820c is located at a seventh location 807 or outwardly of the seventh location 807. The fourth AF coil 822d associated with a fourth magnet 820d is located at a tenth location 810 or outwardly of the tenth location 810.

The first OIS coil 824a associated with a first magnet 820a is located in a third location 803. The second OIS coil 824b associated with a second magnet 820b is located in a sixth location 806. The third OIS coil 824c associated with a third magnet 820c is located in a ninth location 809. The fourth OIS coil 824d associated with a fourth magnet 820d is located in a twelfth location 812.

Figure 9:
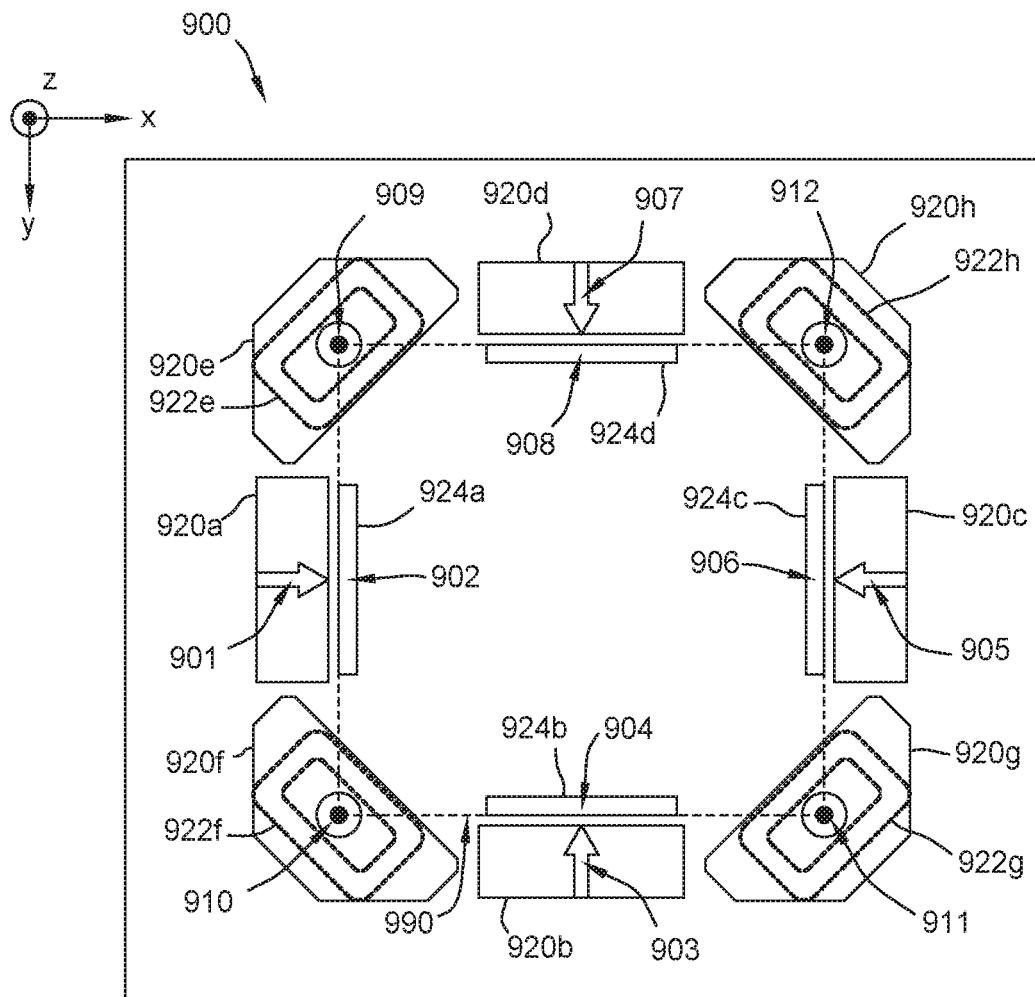

FIG. 9 illustrates a schematic top view of a multiple coil arrangement 900 of an optical device, according to disclosed embodiments. The multiple coil arrangement 900 includes eight magnets 920a-h, four AF coils 922e-h, and four OIS coils 924a-d disposed along a square pattern 990. A first plurality of magnets 920e-h (four are shown) are disposed at four corners of the square pattern 990. A second plurality of magnets 920a-d (four are shown) are disposed at four sides of the square pattern 990. A first magnet 920a is located in a first location 901, A second magnet 920b is located in a third location 903, a third magnet 920c is located in a fifth location 905, and a fourth magnet 920d is located in a seventh location 907. A fifth magnet 920e is located in a ninth location 909, a sixth magnet 920f is located in a tenth location 910, a seventh magnet 920g is located in an eleventh location 911, and an eighth magnet 920h is located in a twelfth location 912. The first plurality of magnets 920e-h are non-regular octagonal in shape and the second plurality of magnets 920a-d are rectangular in shape.

The second plurality of magnets 920a-d located on each side of the square pattern 990 are magnetized horizontally toward a lens (such as the lens 304) to generate magnetic fields horizontally in horizontal directions toward a center of the square pattern 990 and toward the lens. A north pole of each magnet of the plurality of magnets 920a-d faces inwardly towards the center (e.g., the lens location) of the square pattern 990 and a south pole of each magnet of the plurality of magnets 920a-d faces outwardly away from the center (e.g., the lens location) of the square pattern 990. The plurality of magnets 920e-h located on each corner of the square pattern 990 generate magnetic fields vertically in vertical directions in the z-direction (e.g., into or out of the page). In one example, a north pole of each magnet of the plurality of magnets 920e-h faces in a direction out of the page and the south pole of each magnet of the plurality of magnets 920e-h faces in a direction into the page.

The first AF coil 922e associated with a fifth magnet 920e is located in the ninth location 909 or inwardly of the ninth location 909. The second AF coil 922f associated with a sixth magnet 920f is located in the tenth location 910 or inwardly of the tenth location 910. The third AF coil 922g associated with a seventh magnet 920g is located in the eleventh location 911 or inwardly of the eleventh location 911. The fourth AF coil 922h associated with an eighth magnet 920h is located in the twelfth location 912 or inwardly of the twelfth location 912.

The first OIS coil 924a associated with a first magnet 920a is located in a second location 902. The second OIS coil 924b associated with a second magnet 902b is located in a fourth location 904. The third OIS coil 924c associated with a third magnet 920c is located in a sixth location 906. The fourth OIS coil 924d associated with a fourth magnet 920d is located in an eighth location 908.

In one embodiment, which can be combined with other embodiments, the first plurality of magnets 920e-h are associated with vertically moving and/or tilting the lens, and the second plurality of magnets 920a-d are associated with horizontally moving the lens.

In one embodiment, which can be combined with other embodiments, the AF coils 922e-h are aligned entirely under respective magnets of the first plurality of magnets 920e-h. In one embodiment, which can be combined with other embodiments, each AF coil of the AF coils 922e-h is aligned between an inner surface and an outer surface of a respective magnet of the first plurality of magnets 920e-h. In one example, centers of the AF coils 922e-h in the x-y plane are aligned vertically under centers of respective magnets of the first plurality of magnets 920e-h in the x-y plane. In one example, a center of each AF coil of the AF coils 922e-h in the x-y plane is aligned between an inner surface and an outer surface of each respective magnet of the first plurality of magnets 920e-h in the x-y plane. Magnetizations of the first plurality of magnets 920e-h being oriented vertically in vertical directions facilitates aligning each AF coil of the AF coils 922e-h between an inner surface and an outer surface of a respective magnet of the first plurality of magnets 920e-h.

By including separate magnets for each of the plurality of AF coils 922e-h and for each of the plurality of OIS coils 924a-d, the edges and corners of the square pattern are more fully utilized, facilitating compactness of optical devices and camera systems. Space within the square pattern 990 is also saved as each of the plurality of AF coils 922e-h are located either underneath, above, or both underneath and above the plurality of magnets 920e-h associated with each of the plurality of AF coils 922e-h. Furthermore, the magnetic field may be maximized for both the plurality of AF coils 922e-h and the plurality of OIS coils 924a-d, such that each coil 922e-h is associated with an individual magnet of the plurality of magnets 920a-h. By maximizing the magnetic field applied to each of the plurality of OIS coils 924a-d and the plurality of AF coils 922e-h, power may be saved.

Figure 10:
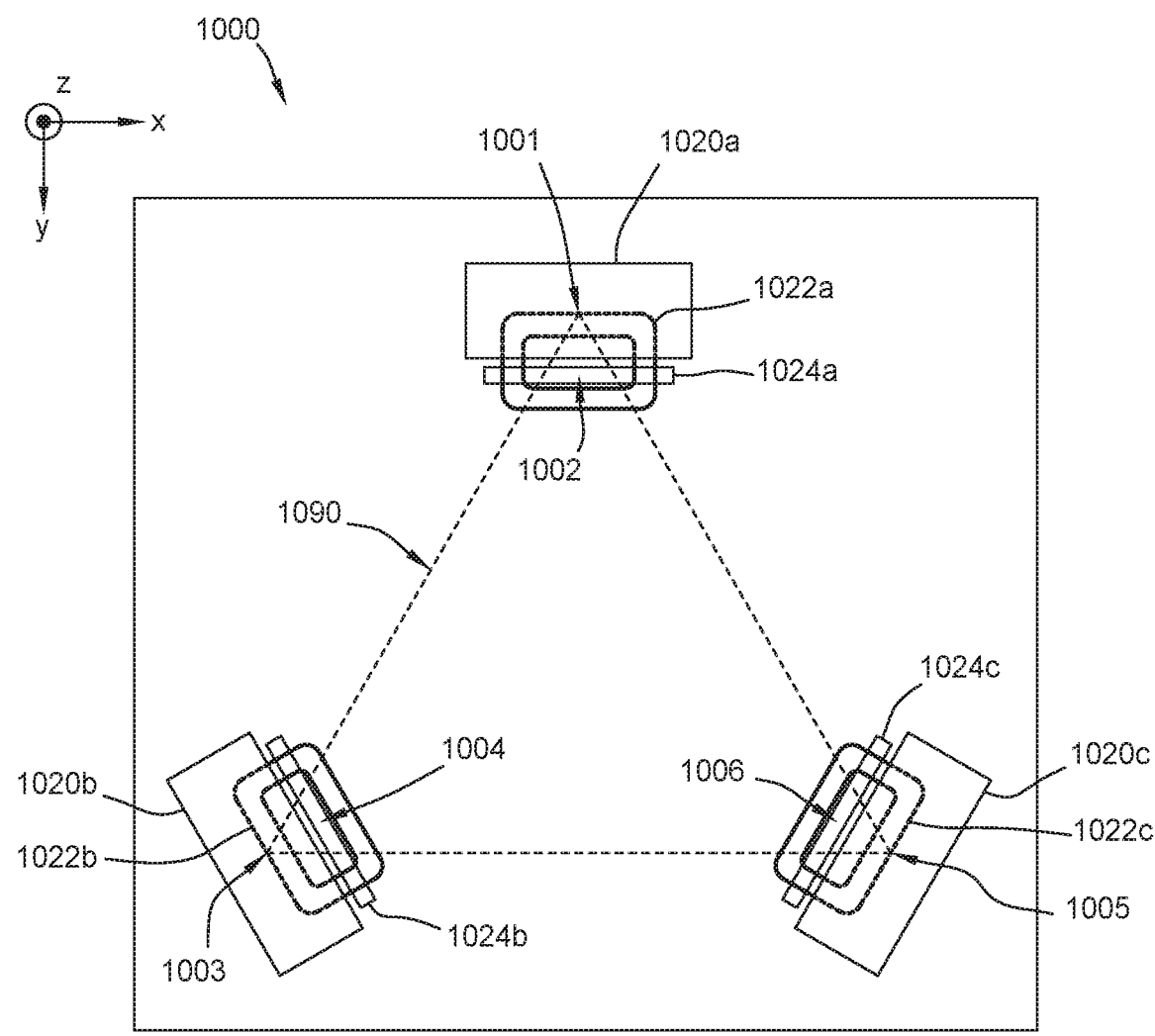

FIG. 10 illustrates a schematic top view of a multiple coil arrangement 1000 of an optical device, according to disclosed embodiments. The multiple coil arrangement 1000 includes three magnets 1020a-c, three AF coils 1022a-c, and three OIS coils 1024a-c is disposed along a triangular pattern 1090. Each corner of the triangular pattern 1090 includes a magnet from the three magnets 1020a-c disposed at the respective corner. A first magnet 1020a is located in a first location 1001, a second magnet 1020b is located in a third location 1003, and a third magnet 1020c is located in a fifth location 1005. The magnets 1020a-c, the AF coils 1022a-c, and the OIS coils 1024a-c are oriented toward a center of the triangular pattern 1090. In one embodiment, which can be combined with other embodiments, centers of the three magnets 1020a-c in the x-y plane are aligned with the three respective corners of the triangular pattern 1090.

The first AF coil 1022a associated with the first magnet 1020a is located between the first location 1001 and a second location 1002. The second AF coil 1022b associated with the second magnet 1020b is located between the third location 1003 and a fourth location 1004. The third AF coil 1022c associated with the third magnet 1020c is located between the fifth location 1005 and a sixth location 1006.

The first OIS coil 1024a associated with the first magnet 1020a is located in the second location 1002. The second OIS coil 1024b associated with the second magnet 1020b is located in the fourth location 1004. The third OIS coil 1024c associated with a third magnet 1020c is located in the sixth location 1006. The aspects shown in FIG. 10 facilitate OIS functions and AF functions, and facilitate space savings, cost savings, and compactness of designs by using less coils and less magnets.

Figure 11:
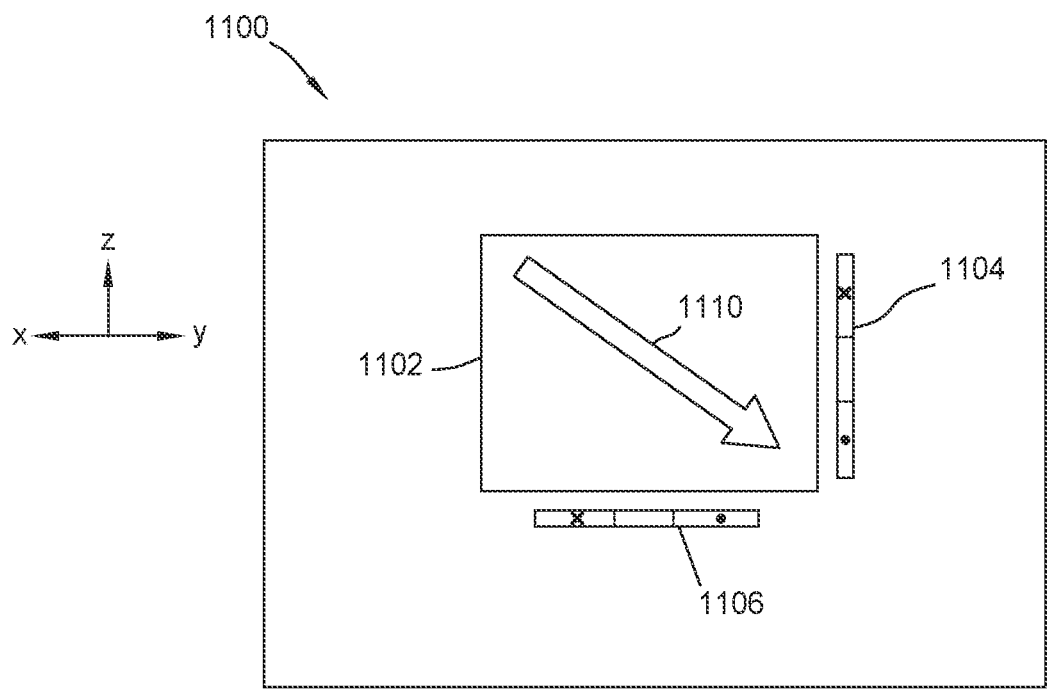
FIGS. 11-13 are schematic illustrations of side views of multiple coil arrangements of an optical device of a camera system, according to disclosed embodiments.
Figure 12:
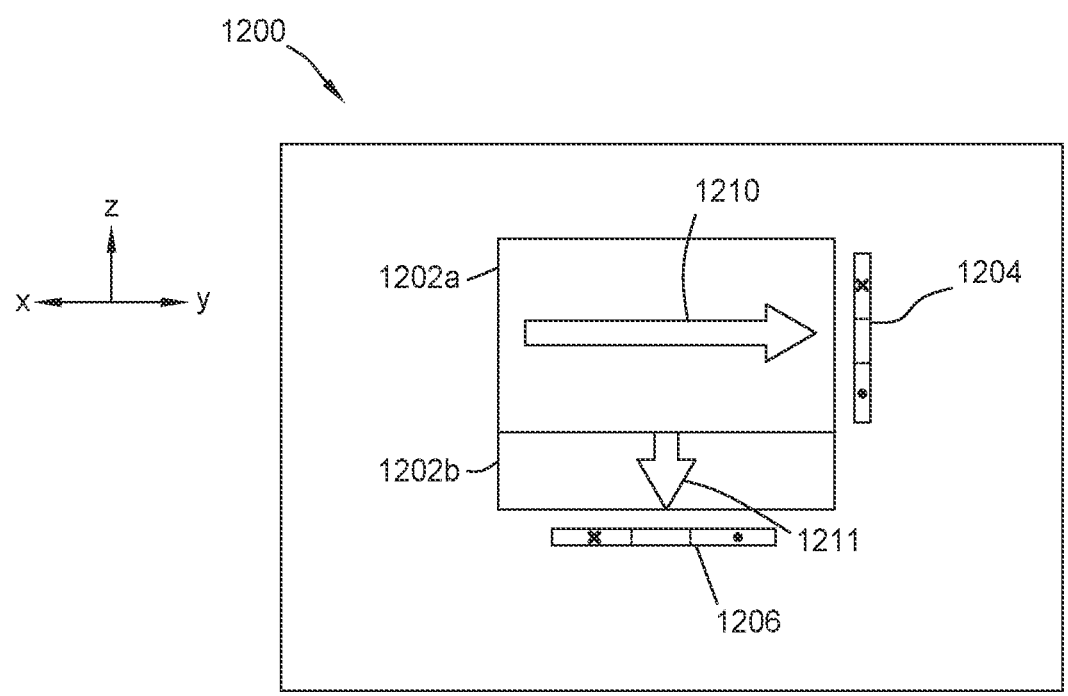
Figure 13:
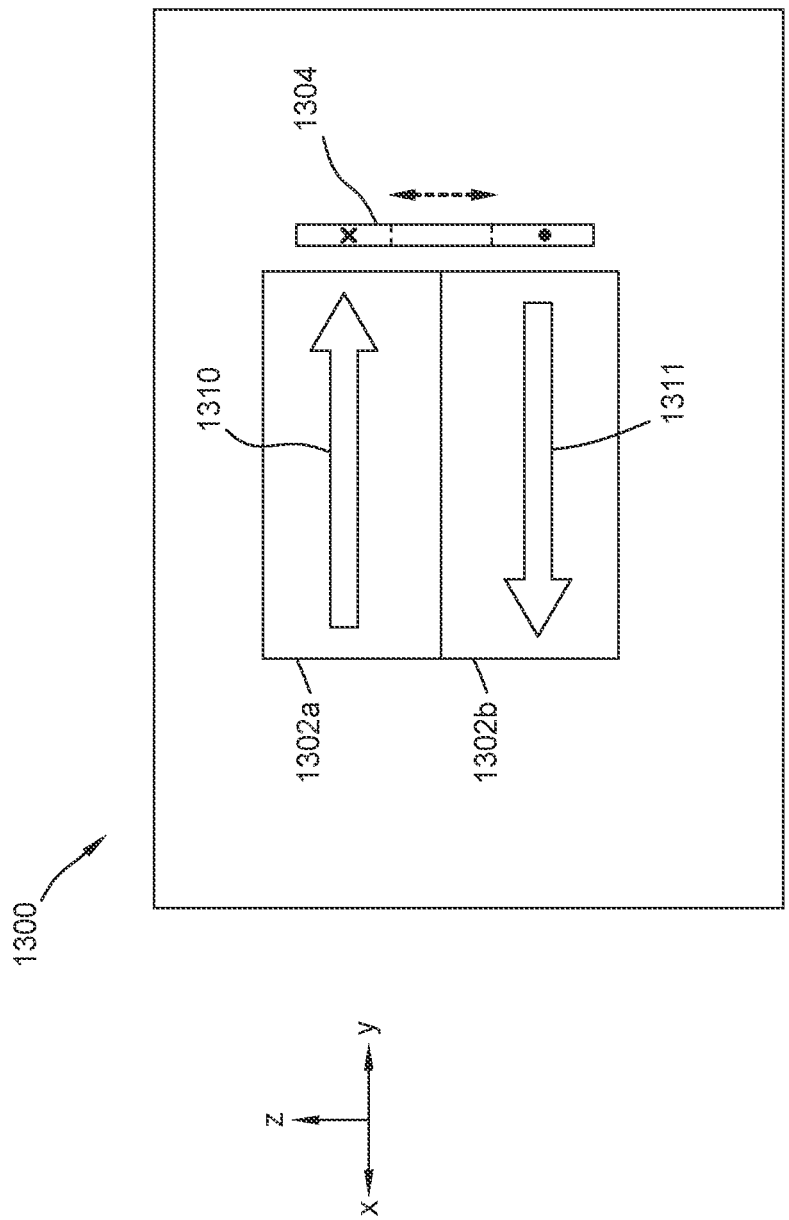

FIGS. 11-13 are schematic illustrations of side views of multiple coil arrangements 1100, 1200, 1300 of an optical device of a camera system, according to disclosed embodiments. Each magnet apparatus of the multiple coil arrangements 1100, 1200, 1300 may include two or more magnets coupled together. In one example of a multiple coil arrangement of a camera system including a single magnet for each magnet apparatus, a magnetic field generated points inwardly towards a center of a lens, such that the north pole of the magnet is faces inward towards the lens and the south pole of the magnet faces outwards away from the lens. In one example, the north pole of the magnet faces inward towards the lens at an angle relative to the horizontal plane (as shown in FIG. 11), and the south pole of the magnet faces outwards away from the lens at 180° opposite of the north pole. The angle is about 90° from the horizontal plane (as shown in FIG. 12) or is an oblique angle that is about 45° from the horizontal plane (as shown in FIG. 11). The listed angles are not intended to be limiting, but to provide examples of possible embodiments.

In a multiple coil arrangement including a first magnet coupled to a second magnet, the first magnet may have a magnetic field generated that is antiparallel to the magnetic field generated by the second magnet. In one example, the first magnet may have a magnetic field generated that is perpendicular to the magnetic field generated by the second magnet.

The multiple coil arrangement 1100 shown in FIG. 11 illustrates a first magnet 1102 with a magnetic field 1110 pointing at an oblique angle about 45° below and relative to the horizontal plane (e.g., the x-y plane). An OIS coil 1104 is located inwardly of the first magnet 1102 and parallel to a vertical plane (e.g., the y-z plane). An AF coil 1106 is disposed below the first magnet 1102 and parallel to the horizontal plane. The first magnet 1102 is magnetized horizontally inwardly toward the lens and toward the OIS coil 1104. The first magnet 1102 is also magnetized vertically (e.g., downwardly) toward the image sensor and toward the AF coil 1106.

The magnetic field of the OIS coil 1104 and magnetic field of the AF coil 1106 may be close to identical as the polarization of the magnetic field 1110 of the magnet 1102 is at about a 45° angle below the horizontal plane. By having the magnetic field 1110 at the previously referenced angle, the coil design of both the OIS coil 1104 and the AF coil 1106 may be similar (e.g., the same number of turns), facilitating simpler configurations. The magnetic fields experienced by the OIS coils 1104 and the AF coils 1106 are about the same, facilitating lower power consumption as power consumption is proportional to the square of current. Furthermore, space in the camera system may be saved as the AF coil 1106 is located underneath the magnet 1102.

In the multiple coil arrangement 1200 shown in FIG. 12, a first magnet 1202a with a magnetic field 1210 pointing in a horizontal direction (e.g., inwardly and toward the lens) and a second magnet 1202b with a magnetic field 1211 pointing in a vertical direction (e.g., downwardly and toward the image sensor). A north pole of the first magnet 1202a faces inwardly toward the lens and a south pole of the first magnet 1202a faces outwardly away from the lens. A north pole of the second magnet 1202b faces downwardly (e.g., parallel to a direction from the lens and toward the image sensor) and a south pole of the second magnet 1202b faces upwardly (e.g., parallel to a direction from the image sensor and toward the lens). The magnetic field 1210 of the first magnet 1202a is perpendicular to the magnetic field 1211 of the second magnet 1202b. An OIS coil 1204 is located parallel to the vertical plane of the first magnet 1202a. An AF coil 1206 is located parallel to the horizontal plane of the second magnet 1202b. By having a dedicated second magnet 1202b acting on the AF coil 1206, the magnetic field experienced by the AF coil 1206 is larger, facilitating efficiency and less electrical power (e.g., current) needed for the AF coils. Thus, the amount of current needed to adjust the AF coil 1206 is reduced.

In the multiple coil arrangement shown in FIG. 13, a first magnet 1302a with a magnetic field 1310 pointing in the horizontal direction and a second magnet 1302b with a magnetic field 1311 pointing to the opposite horizontal direction. A magnetization of the first magnet 1302a is antiparallel to a magnetization of the second magnet 1302b. The magnetic field 1310 of the first magnet 1302a is antiparallel to the magnetic field 1311 of the second magnet 1302b. An AF coil 1304 is located parallel to the vertical plane of both the first magnet 1302a and the second magnet 1302b. The antiparallel magnetic fields 1310, 1311 of the first magnet 1302a and the second magnet 1302b changes the AF coil 1304 force direction by 90°. By changing the AF coil 1304 force direction by 90°, the AF coil 1304 is able to move in the z-direction such that the AF coil 1304 is used to move a lens or an image sensor vertically in the z-direction. In one embodiment, which can be combined with other embodiments, the second magnet 1302b is disposed in contact with the first magnet 1302a. In one example, the second magnet 1302b is coupled to the first magnet 1302a.

Though the multiple coil arrangements 1100, 1200, 1300 illustrate a single magnet 1102, a single pair of magnets 1202a, 1202b, and a single pair of magnets 1302a, 1302b, the disclosed embodiments may reflect on some or all of the plurality of magnets or the plurality of pairs of magnets of a camera system.

Benefits of the present disclosure include utilizing a plurality of magnets and a plurality of AF coils to achieve more specialized lens configurations that facilitate tilt and that facilitate optimal image stabilization (OIS) and autofocus (AF) of camera systems. By using magnetic field directions described herein for magnets or by having dedicated magnets for each of the plurality of AF coils and/or the plurality of OIS coils, power and space within the optical device and camera system may be saved. Furthermore, by adjusting the currents of the AF coils individually, a lens tilt is achieved. The lens tilt may remedy misalignment between the lens and the image sensor plane as well as achieve a wider angle of view during device operation.

It is contemplated that one or more aspects disclosed herein may be combined. Moreover, it is contemplated that one or more aspects disclosed herein may include some or all of the aforementioned benefits. As an example, the present disclosure contemplates that one or more of the aspects, features, components, and/or properties of the lens 304, the optical device 301, the image sensor 310, the multiple coil arrangements 400, 425, 450, the multiple coil arrangements 500-1000, and/or the multiple coil arrangements 1100-1300 may be combined.

In one embodiment, an optical device comprises a lens, an image sensor disposed below the lens, a plurality of magnets disposed about the lens, and a plurality of vertical coil structures coiled in one or more vertical planes. The optical device includes a plurality of horizontal coil structures coiled in one or more horizontal planes. The plurality of horizontal coil structures tilt the lens when differing electrical power is applied to at least two of the plurality of horizontal coil structures. Each of the horizontal planes is oriented perpendicularly to the one or more vertical planes. In one example, each horizontal coil structure of the plurality of horizontal coil structures is disposed at least partially below a lower surface of a respective magnet of the plurality of magnets. In one example, a first portion of each horizontal coil structure is aligned vertically under the lower surface of the respective magnet, a second portion of each horizontal coil structure is aligned vertically inwardly of an inner surface of the respective magnet, and a center of each horizontal coil structure is aligned vertically under the inner surface of the respective magnet. In one example, a first portion of each horizontal coil structure is aligned vertically under the lower surface of the respective magnet, a second portion of each horizontal coil structure is aligned vertically outwardly of an outer surface of the respective magnet, and a center of each horizontal coil structure is aligned vertically under the outer surface of the respective magnet. The optical device includes a second plurality of horizontal coil structures coiled in one or more second horizontal planes, where each second horizontal coil structure of the second plurality of horizontal coil structures is disposed at least partially above an upper surface of the respective magnet of the plurality of magnets.

In one example, each vertical coil structure of the plurality of vertical coil structures is disposed inwardly of an inner surface of a respective magnet of the plurality of magnets. In one example, each vertical coil structure of the plurality of vertical coil structures is disposed outwardly of an outer surface of a respective magnet of the plurality of magnets. In one example, the plurality of magnets are disposed at corners of a pattern or at sides of the pattern. The pattern is a square pattern or a triangular pattern. A surface of each magnet of the plurality of magnets faces a respective horizontal coil structure of the plurality of horizontal coil structures, the surface of each magnet includes a first surface area, and the respective horizontal coil structure includes a second surface area facing the surface of the magnet. The second surface area is a ratio of the first surface area, and the ratio is within a range of 0.8 to 1.2. In one example, the lens, the plurality of vertical coil structures, and the plurality of horizontal coil structures are coupled to a suspendable structure that is magnetically suspendable. In one example, the image sensor, the plurality of vertical coil structures, and the plurality of horizontal coil structures are coupled to a suspendable structure that is magnetically suspendable. A camera system including the optical device is also disclosed.

In one embodiment, an optical device comprises a lens, an image sensor disposed below the lens, and a plurality of magnets disposed about the lens. The optical device also includes a plurality of vertical coil structures coiled in one or more vertical planes, and a plurality of horizontal coil structures coiled in one or more horizontal planes. The plurality of horizontal coil structures tilt the lens when differing electrical power is applied to at least two of the plurality of horizontal coil structures. Each of the horizontal planes is oriented perpendicularly to the one or more vertical planes. Each horizontal coil structure of the plurality of horizontal coil structures is disposed at least partially above an upper surface of a respective magnet of the plurality of magnets. In one example, a first portion of each horizontal coil structure is aligned vertically above the upper surface of the respective magnet, and a second portion of each horizontal coil structure is aligned inwardly of an inner surface of the respective magnet. A center of each horizontal coil structure is aligned vertically above the inner surface of the respective magnet. In one example, a first portion of each horizontal coil structure is aligned vertically above the upper surface of the respective magnet, a second portion of each horizontal coil structure is aligned outwardly of an outer surface of the respective magnet, and a center of each horizontal coil structure is aligned vertically above the outer surface of the respective magnet. A camera system including the optical device is also disclosed.

In one embodiment, an optical device comprises a lens, an image sensor disposed below the lens, a first plurality of magnets disposed about the lens and at corners of a square pattern, and a second plurality of magnets disposed about the lens and at sides of the square pattern. The optical device includes a plurality of vertical coil structures coiled in one or more vertical planes. Each vertical coil structure of the plurality of vertical coil structures is disposed inwardly of an inner surface of a respective magnet of the second plurality of magnets. The optical device also includes a plurality of horizontal coil structures coiled in one or more horizontal planes. Each of the horizontal planes is oriented perpendicularly to the one or more vertical planes, and each horizontal coil structure of the plurality of horizontal coil structures is disposed at least partially above or below a respective magnet of the first plurality of magnets. The first plurality of magnets are magnetized vertically to generate magnetic fields vertically in vertical directions, and the second plurality of magnets are magnetized horizontally toward the lens to generate magnetic fields horizontally in horizontal directions toward the lens. Each horizontal coil structure of the plurality of horizontal coil structures is aligned between an inner surface and an outer surface of a respective magnet of the first plurality of magnets. A camera system including the optical device is also disclosed.

While the foregoing is directed to embodiments of the present disclosure, other and further embodiments of the disclosure may be devised without departing from the basic scope thereof, and the scope thereof is determined by the claims that follow.

What is claimed is:

1. An optical device, comprising:
   a base defining an X-Y plane extending parallel to the base and a Z-axis extending perpendicularly to the X-Y plane;
   a lens;
   an image sensor disposed below the lens along the Z-axis;
   a plurality of magnets disposed about the lens;
   a plurality of vertical coil structures coiled in one or more vertical planes extending parallel to the Z-axis; and
   a plurality of horizontal coil structures coiled in one or more horizontal planes to tilt the lens relative to the X-Y plane when differing electrical power is applied to at least two of the plurality of horizontal coil structures, each of the horizontal planes oriented perpendicularly to the one or more vertical planes;
   wherein:
      a first portion of each horizontal coil structure of the plurality of horizontal coil structures is aligned vertically under a lower surface of a respective magnet of the plurality of magnets along the Z-axis,
      a second portion of each horizontal coil structure is aligned inwardly of an inner surface of the respective magnet or outwardly of an outer surface of the respective magnet along the X-Y plane, and
      a center of each horizontal coil structure is aligned vertically under the inner surface or the outer surface of the respective magnet along the Z-axis.

2. The optical device of claim 1, further comprising a second plurality of horizontal coil structures coiled in one or more second horizontal planes, wherein each second horizontal coil structure of the second plurality of horizontal coil structures is disposed at least partially above an upper surface of the respective magnet of the plurality of magnets.

3. The optical device of claim 1, wherein each vertical coil structure of the plurality of vertical coil structures is disposed inwardly of the inner surface of a respective magnet of the plurality of magnets.

4. The optical device of claim 1, wherein each vertical coil structure of the plurality of vertical coil structures is disposed outwardly of the outer surface of a respective magnet of the plurality of magnets.

5. The optical device of claim 1, wherein the plurality of magnets are disposed at corners of a pattern or at sides of the pattern, wherein the pattern is a square pattern or a triangular pattern.

6. The optical device of claim 1, wherein a surface of each magnet of the plurality of magnets faces a respective horizontal coil structure of the plurality of horizontal coil structures, the surface of each magnet includes a first surface area, and the respective horizontal coil structure includes a second surface area facing the surface of the magnet, wherein the second surface area is a ratio of the first surface area, and the ratio is within a range of 0.8 to 1.2.

7. The optical device of claim 1, wherein the lens, the plurality of vertical coil structures, and the plurality of horizontal coil structures are coupled to a suspendable structure that is magnetically suspendable.

8. The optical device of claim 1, wherein the image sensor, the plurality of vertical coil structures, and the plurality of horizontal coil structures are coupled to a suspendable structure that is magnetically suspendable.

9. A camera system comprising the optical device of claim 1.

10. An optical device, comprising:
    a base defining an X-Y plane extending parallel to the base and a Z-axis extending perpendicularly to the X-Y plane;
    a lens;
    an image sensor disposed below the lens along the Z-axis;
    a plurality of magnets disposed about the lens;
    a plurality of vertical coil structures coiled in one or more vertical planes extending parallel to the Z-axis; and
    a plurality of horizontal coil structures coiled in one or more horizontal planes to tilt the lens relative to the X-Y plane when differing electrical power is applied to at least two of the plurality of horizontal coil structures, each of the horizontal planes oriented perpendicularly to the one or more vertical planes, wherein each horizontal coil structure of the plurality of horizontal coil structures is disposed at least partially above an upper surface of a respective magnet of the plurality of magnets along the Z-axis.

11. The optical device of claim 10, wherein a first portion of each horizontal coil structure is aligned vertically above the upper surface of the respective magnet, a second portion of each horizontal coil structure is aligned inwardly of an inner surface of the respective magnet, and a center of each horizontal coil structure is aligned vertically above the inner surface of the respective magnet.

12. The optical device of claim 10, wherein a first portion of each horizontal coil structure is aligned vertically above the upper surface of the respective magnet, a second portion of each horizontal coil structure is aligned outwardly of an outer surface of the respective magnet, and a center of each horizontal coil structure is aligned vertically above the outer surface of the respective magnet.

13. A camera system comprising the optical device of claim 10.

14. An optical device, comprising:
a lens;
an image sensor disposed below the lens;
a first plurality of magnets disposed about the lens and at corners of a square pattern;
a second plurality of magnets disposed about the lens and at sides of the square pattern;
a plurality of vertical coil structures coiled in one or more vertical planes, each vertical coil structure of the plurality of vertical coil structures disposed inwardly of an inner surface of a respective magnet of the second plurality of magnets; and
a plurality of horizontal coil structures coiled in one or more horizontal planes, each of the horizontal planes oriented perpendicularly to the one or more vertical planes, and each horizontal coil structure of the plurality of horizontal coil structures disposed at least partially above or below a respective magnet of the first plurality of magnets.

15. The optical device of claim 14, wherein the first plurality of magnets are magnetized vertically to generate magnetic fields vertically in vertical directions, and the second plurality of magnets are magnetized horizontally toward the lens to generate magnetic fields horizontally in horizontal directions toward the lens.

16. The optical device of claim 14, wherein each horizontal coil structure of the plurality of horizontal coil structures is aligned between an inner surface and an outer surface of a respective magnet of the first plurality of magnets.

17. A camera system comprising the optical device of claim 14.

* * * * *